United States Patent
Kim

(10) Patent No.: US 10,148,134 B2
(45) Date of Patent: Dec. 4, 2018

(54) WIRELESS POWER RECEPTION DEVICE

(71) Applicant: LG INNOTEK CO., LTD., Seoul (KR)

(72) Inventor: Yang Hyun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 287 days.

(21) Appl. No.: 14/888,658

(22) PCT Filed: Apr. 30, 2014

(86) PCT No.: PCT/KR2014/003890
§ 371 (c)(1),
(2) Date: Nov. 2, 2015

(87) PCT Pub. No.: WO2014/178667
PCT Pub. Date: Nov. 6, 2014

(65) Prior Publication Data
US 2016/0094049 A1   Mar. 31, 2016

(30) Foreign Application Priority Data

May 2, 2013  (KR) .................. 10-2013-0049305

(51) Int. Cl.
*H02J 50/70* (2016.01)
*H02J 5/00* (2016.01)
(Continued)

(52) U.S. Cl.
CPC .......... *H02J 50/70* (2016.02); *H01F 27/2823* (2013.01); *H01F 27/36* (2013.01);
(Continued)

(58) Field of Classification Search
CPC . H02J 5/005; H02J 50/90; H02J 50/10; H01F 27/36; H01F 27/2823
See application file for complete search history.

(56) References Cited

U.S. PATENT DOCUMENTS

2009/0058358 A1   3/2009   Inoue et al.
2012/0112552 A1   5/2012   Baarman et al.
(Continued)

FOREIGN PATENT DOCUMENTS

JP   2001-338820 A   12/2001
JP   2009-76513 A    4/2009
(Continued)

OTHER PUBLICATIONS

International Search Report, issued in PCT/KR2014/003890, dated Aug. 18, 2014.

*Primary Examiner* — Jared Fureman
*Assistant Examiner* — Emmanuel R Dominique
(74) *Attorney, Agent, or Firm* — Birch, Stewart, Kolasch & Birch, LLP

(57) ABSTRACT

A wireless power reception device for wirelessly receiving electric power from a wireless power transmission device according to an embodiment of the present invention comprises: a magnetic body; a reception coil arranged on the magnetic body and coupled to a transmission coil of the wireless power transmission device to receive electric power; and a magnetic body saturation prevention unit arranged inside the reception coil to prevent the magnetic body from being saturated by an influence of an external magnetic field.

11 Claims, 23 Drawing Sheets

(51) Int. Cl.
*H01F 27/28* (2006.01)
*H01F 27/36* (2006.01)
*H02J 50/10* (2016.01)
*H02J 50/90* (2016.01)

(52) U.S. Cl.
CPC .............. *H02J 5/005* (2013.01); *H02J 50/10* (2016.02); *H02J 50/90* (2016.02)

(56) References Cited

U.S. PATENT DOCUMENTS

| | | | |
|---|---|---|---|
| 2012/0181876 A1 | 7/2012 | Baarman et al. | |
| 2012/0235636 A1* | 9/2012 | Partovi | H02J 7/025 320/108 |
| 2014/0015329 A1* | 1/2014 | Widmer | G01D 5/2006 307/104 |
| 2015/0123604 A1 | 5/2015 | Lee et al. | |

FOREIGN PATENT DOCUMENTS

| | | |
|---|---|---|
| JP | 4835796 B1 | 12/2011 |
| JP | 2012-75199 A | 4/2012 |
| JP | 2012-84894 A | 4/2012 |
| JP | 2013-21902 A | 4/2012 |
| JP | 2012-147638 A | 8/2012 |
| JP | 2012-199370 A | 10/2012 |
| JP | 2012-222926 A | 11/2012 |
| JP | 2013-4964 A | 1/2013 |
| KR | 10-1177302 B1 | 8/2012 |
| KR | 10-1232035 B1 | 2/2013 |
| KR | 10-2013-0072181 A | 7/2013 |
| WO | WO 2013/011907 A1 | 1/2013 |

* cited by examiner

[FIG. 1]
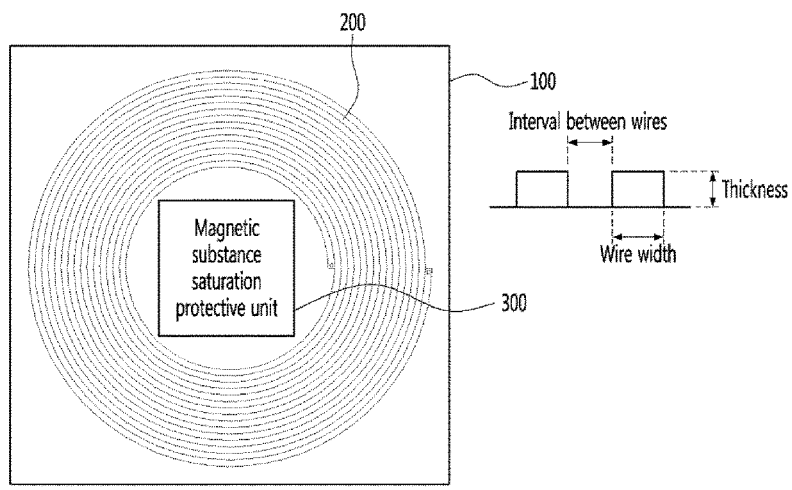
[FIG. 2]
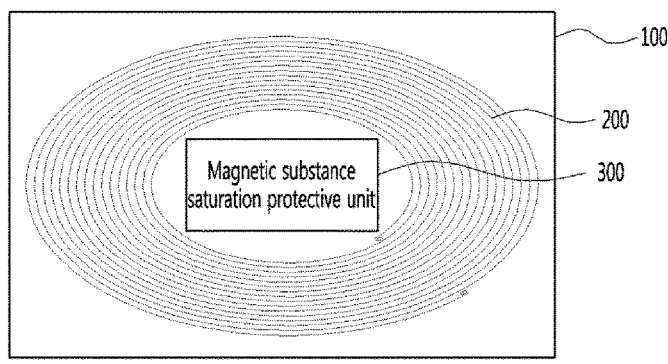
[FIG. 3]
| Frequency | Thickness of reception coil | Wire width | Number of winding wires | Inner diameter | Outer diameter | Interval between wires |
|---|---|---|---|---|---|---|
| 100~150KHz | 0.1mm | 0.6mm | 15 | 20mm | 40mm | 0.12~0.14mm |

[FIG. 4]
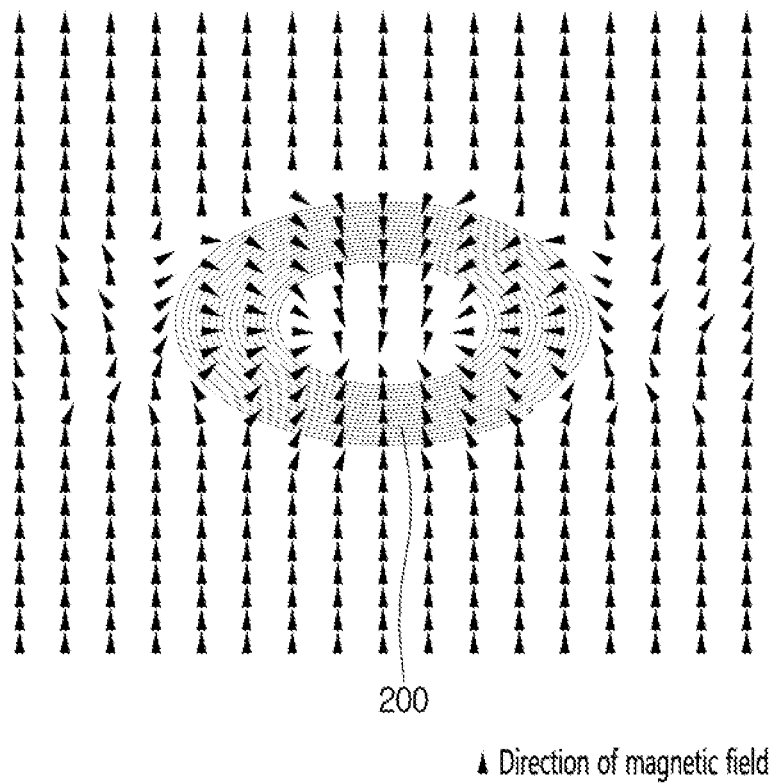
200
▲ Direction of magnetic field

[FIG. 5]
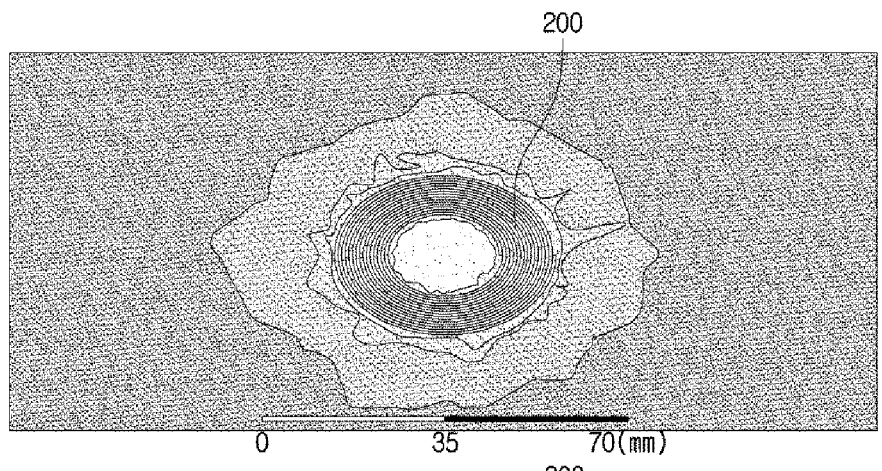
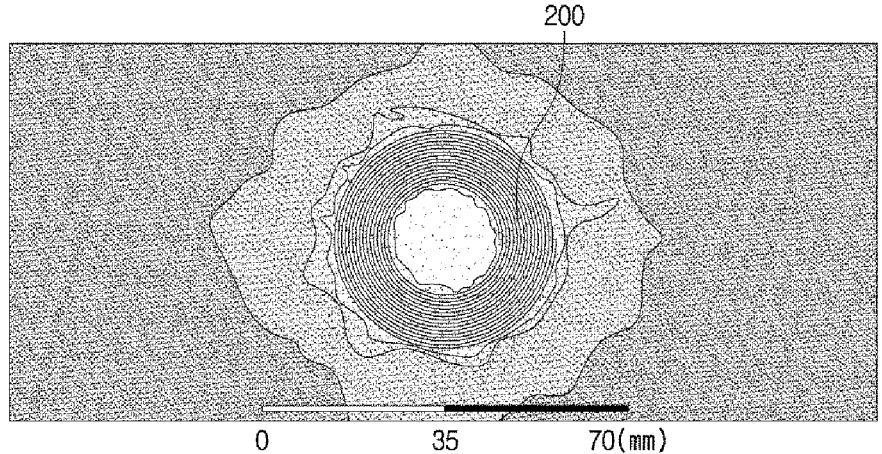
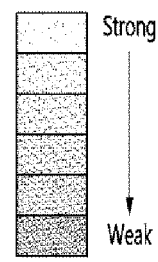
Intensity of magnetic field
Strong
↓
Weak

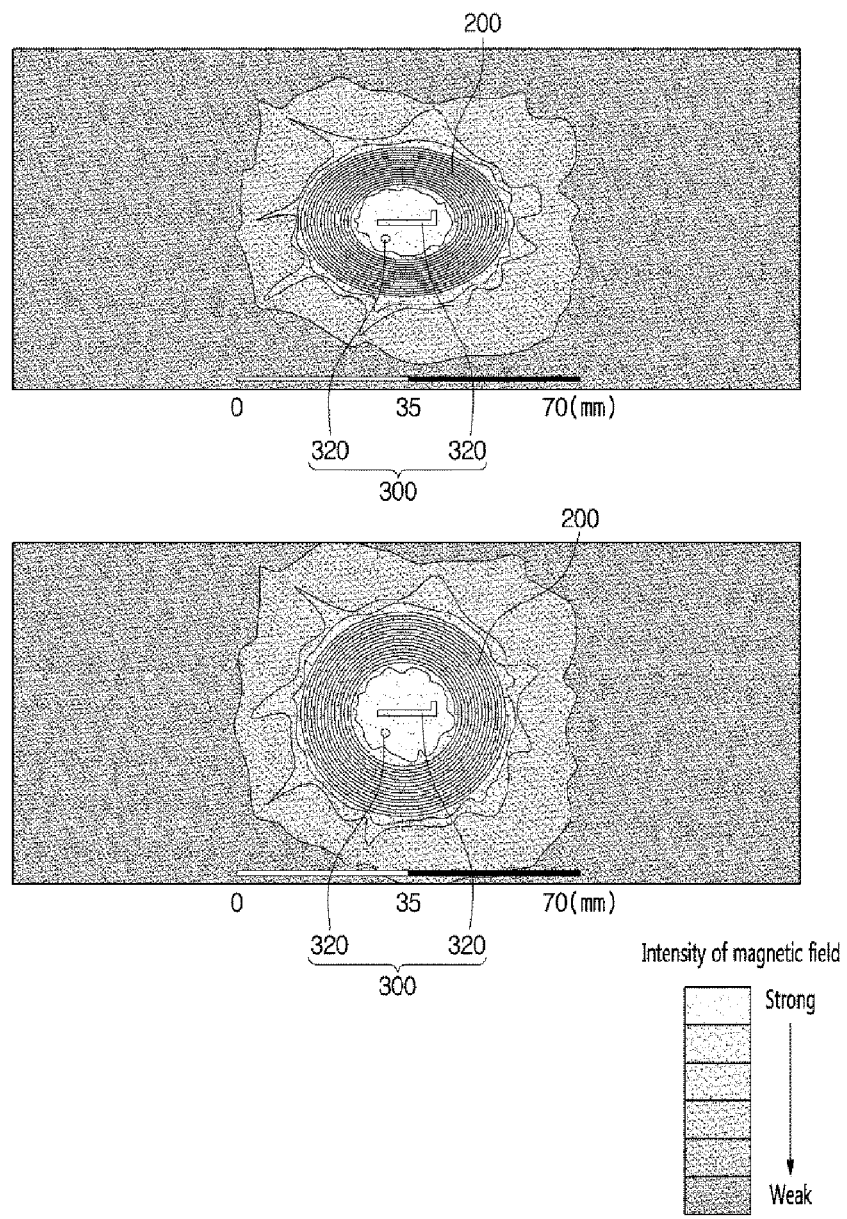
[FIG. 6]

[FIG. 7]
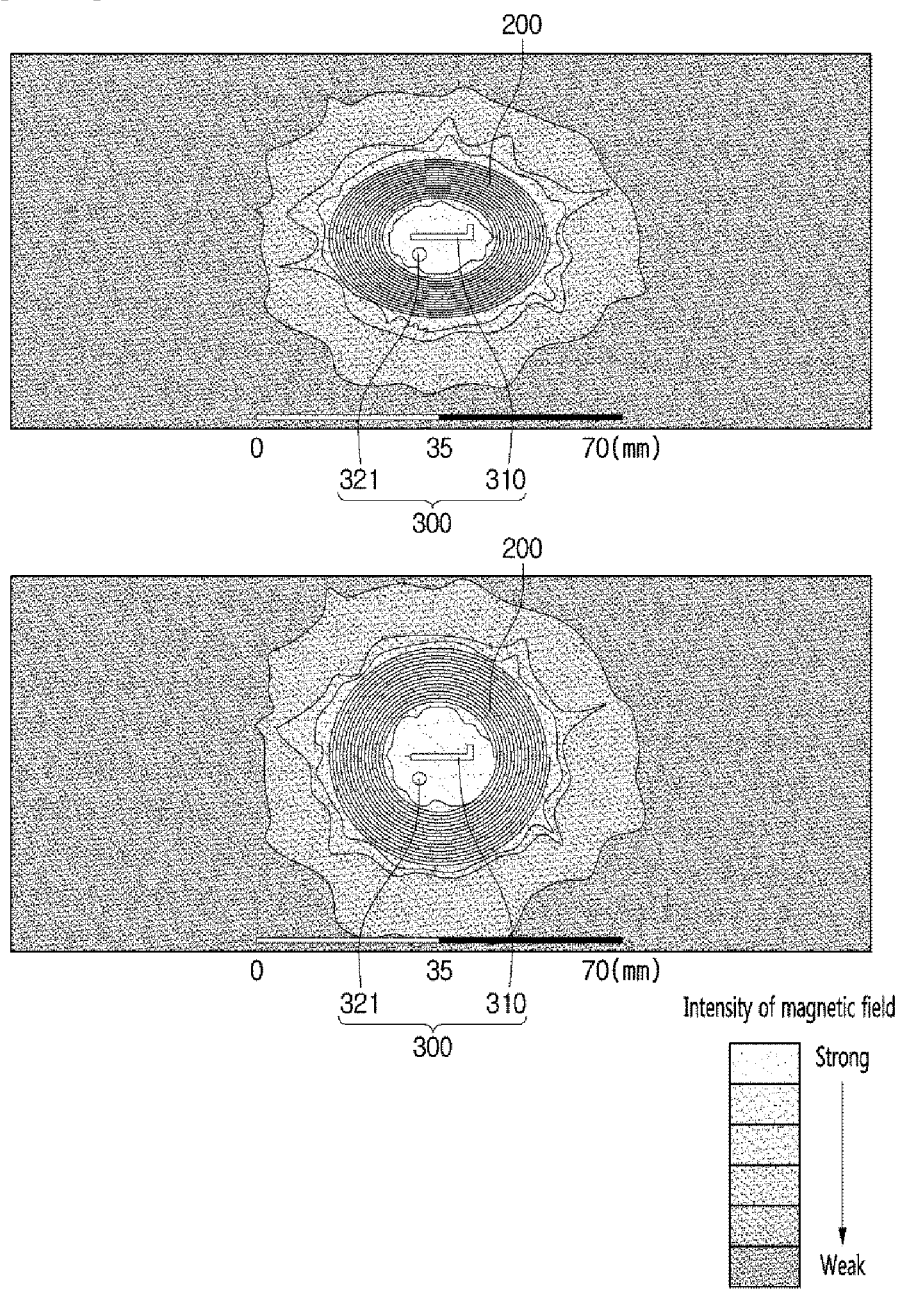

[FIG. 8]
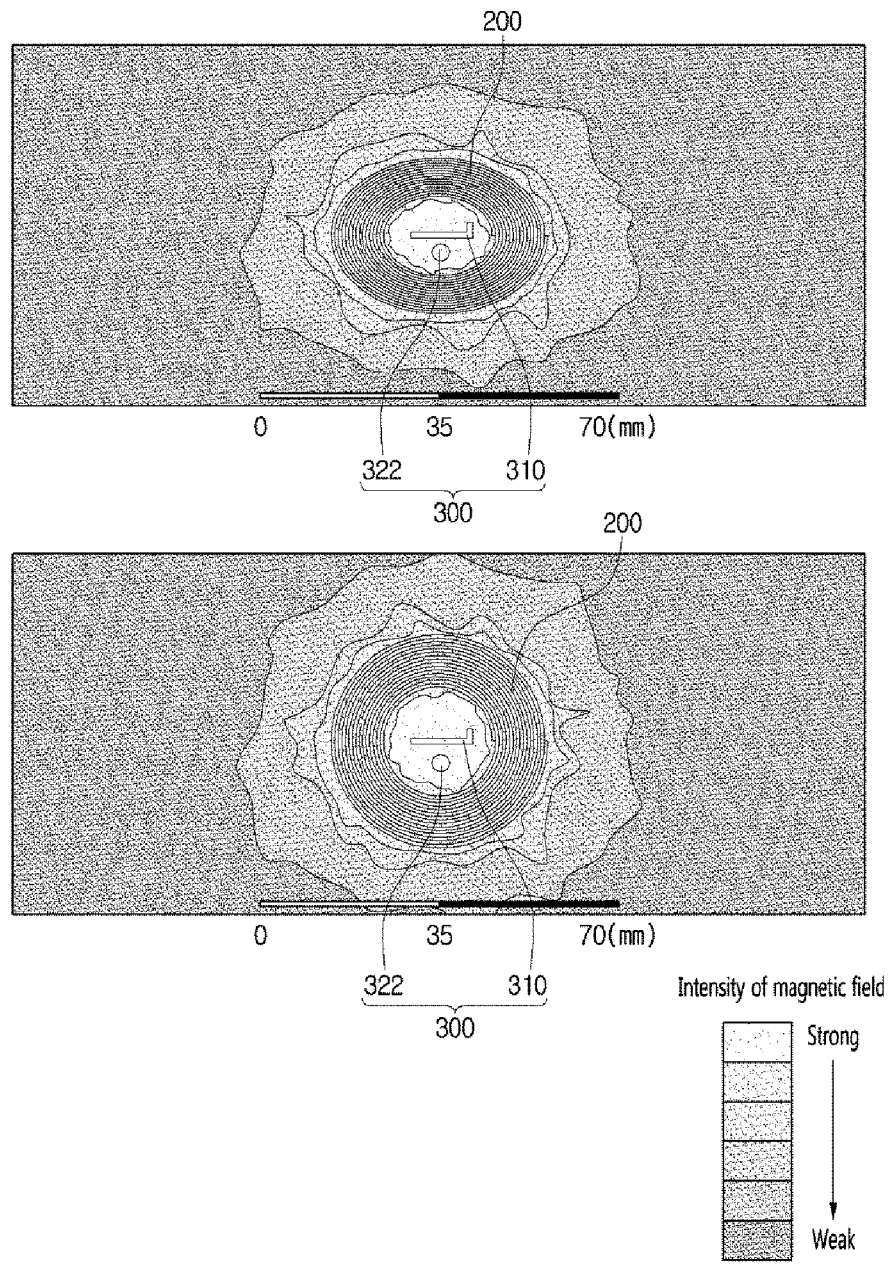

[FIG. 9]
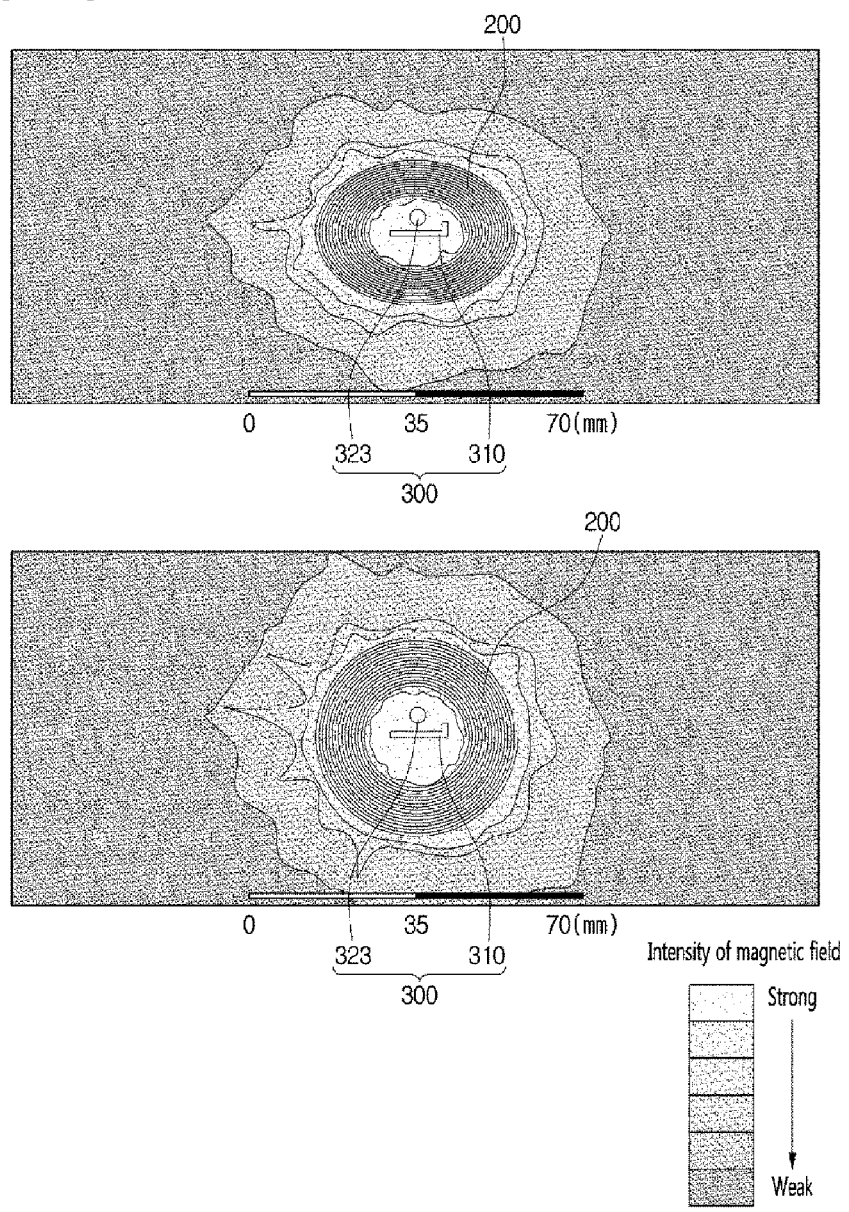

[FIG. 10]
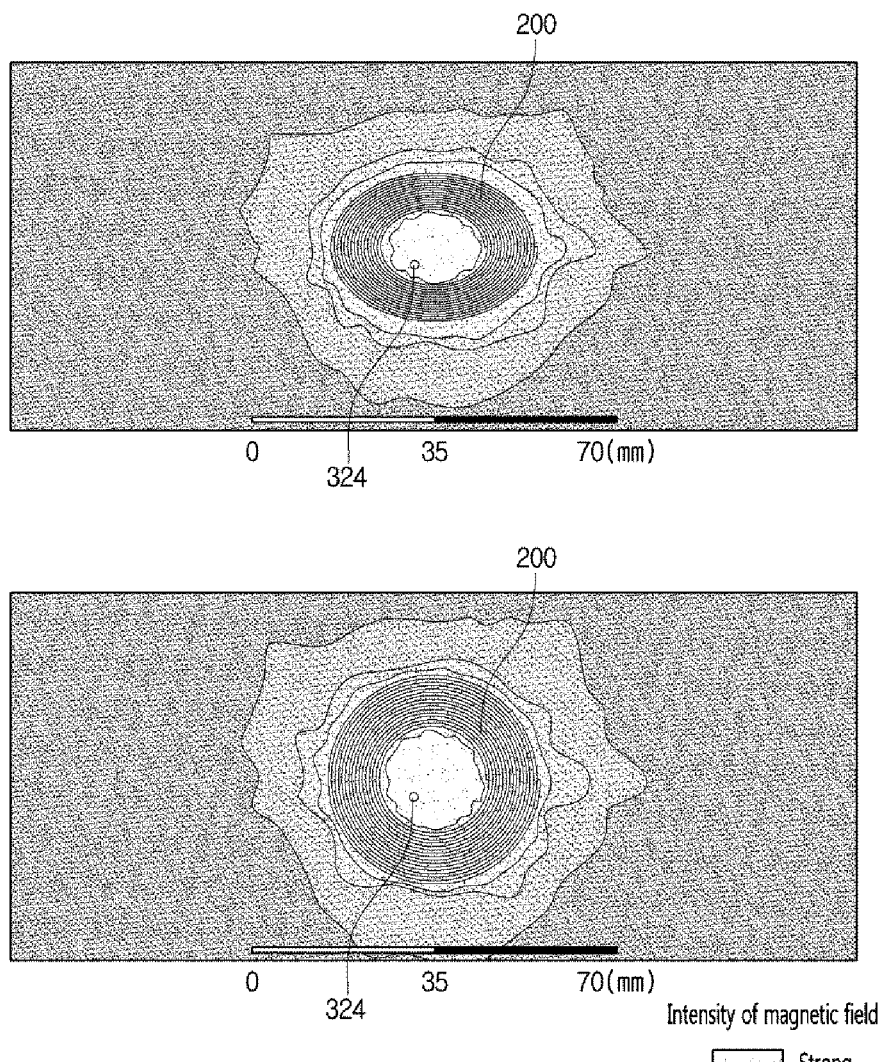

[FIG. 11]
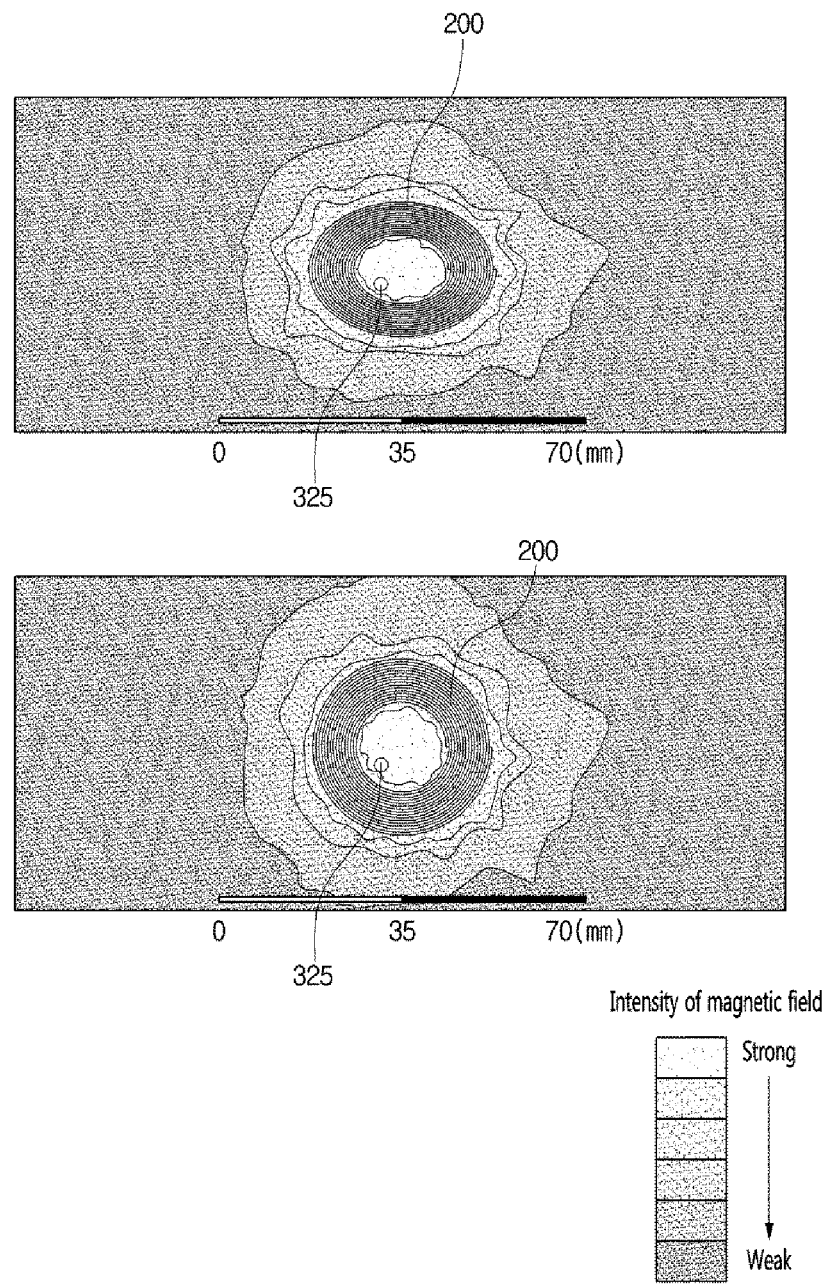

[FIG. 12]
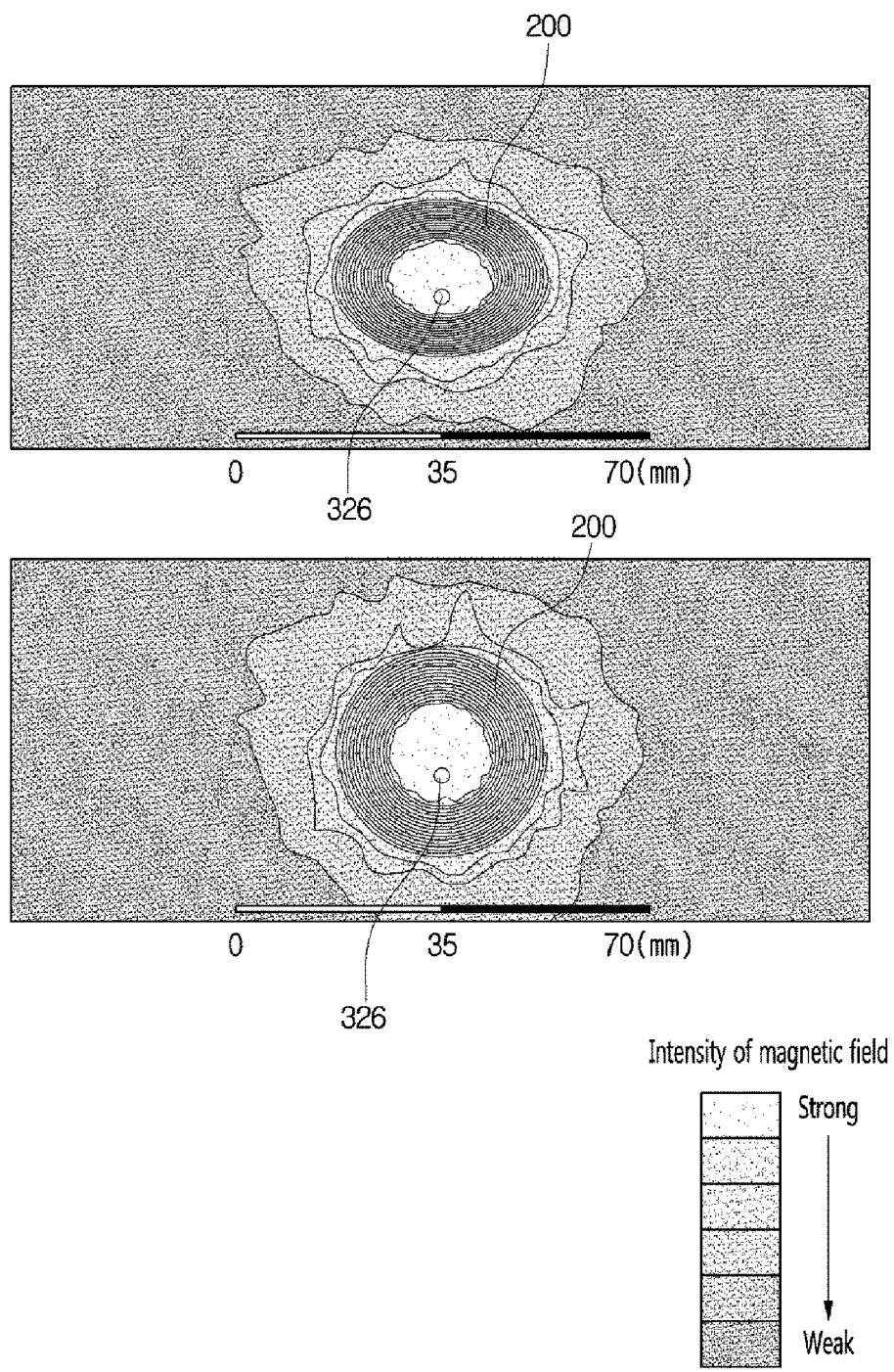

[FIG. 13]
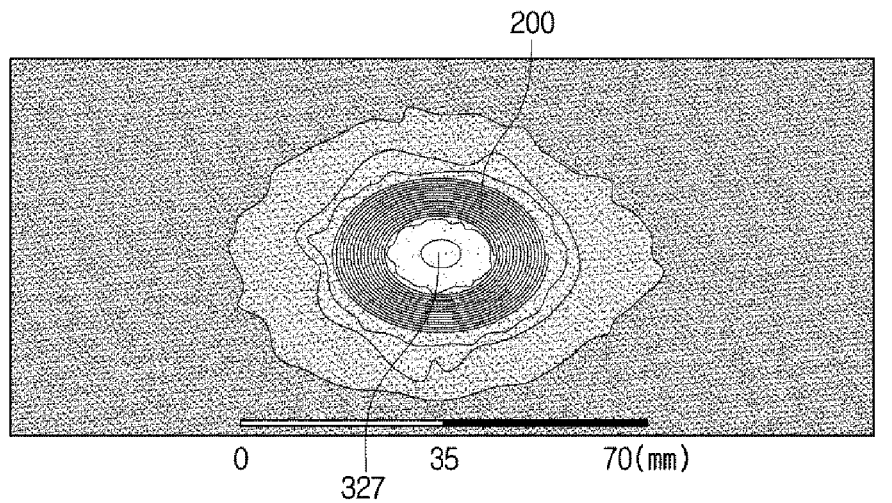
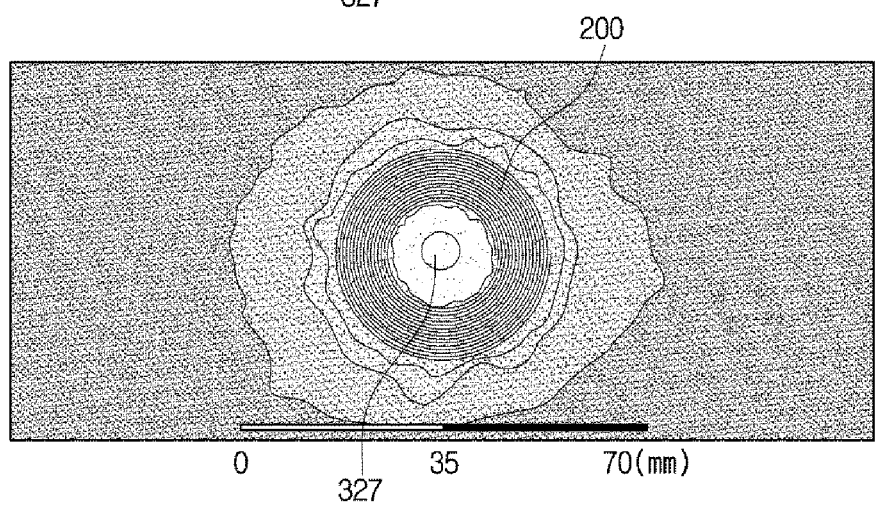
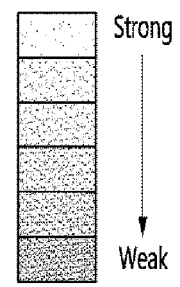

[FIG. 14]
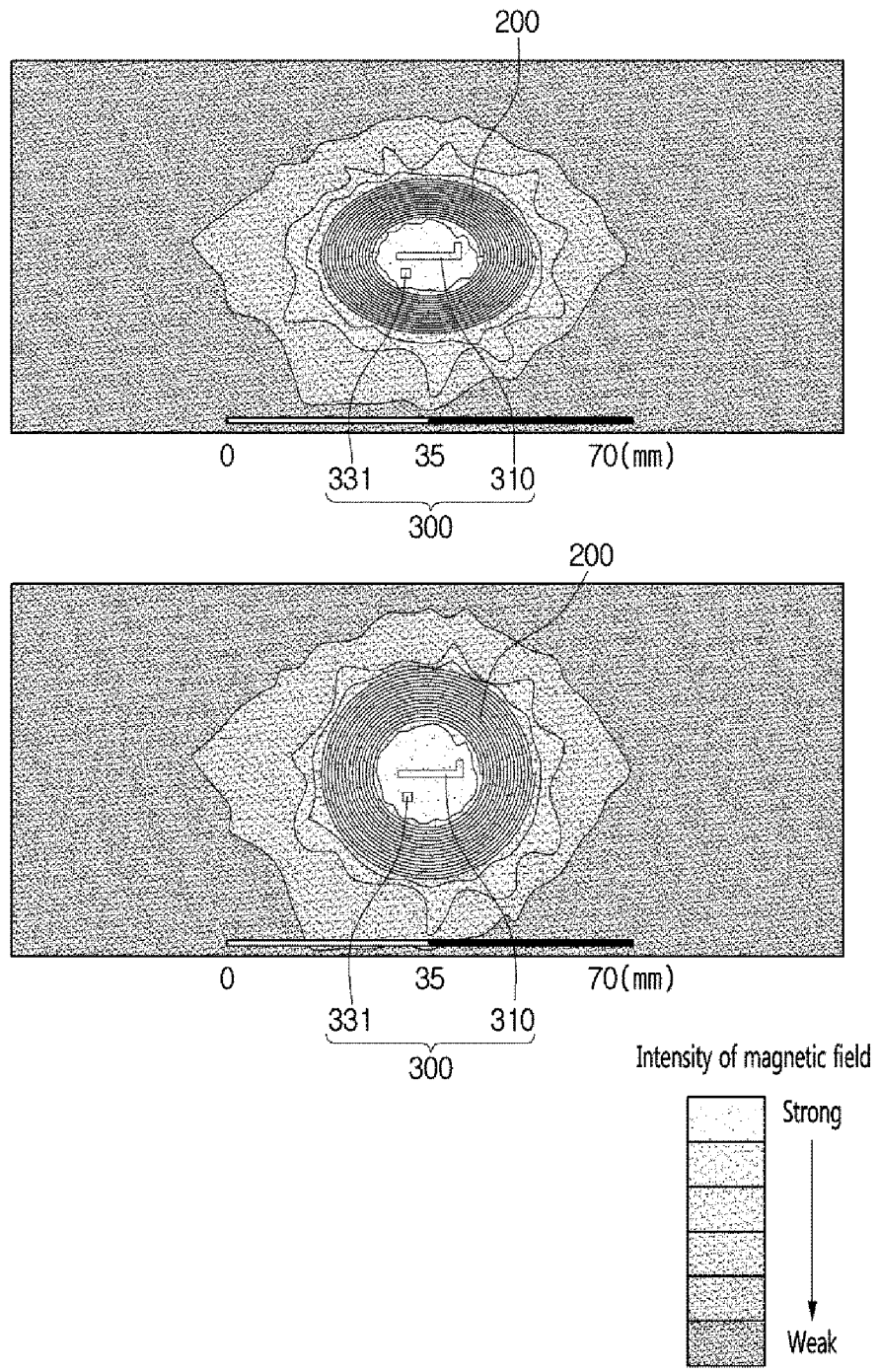

[FIG. 15]
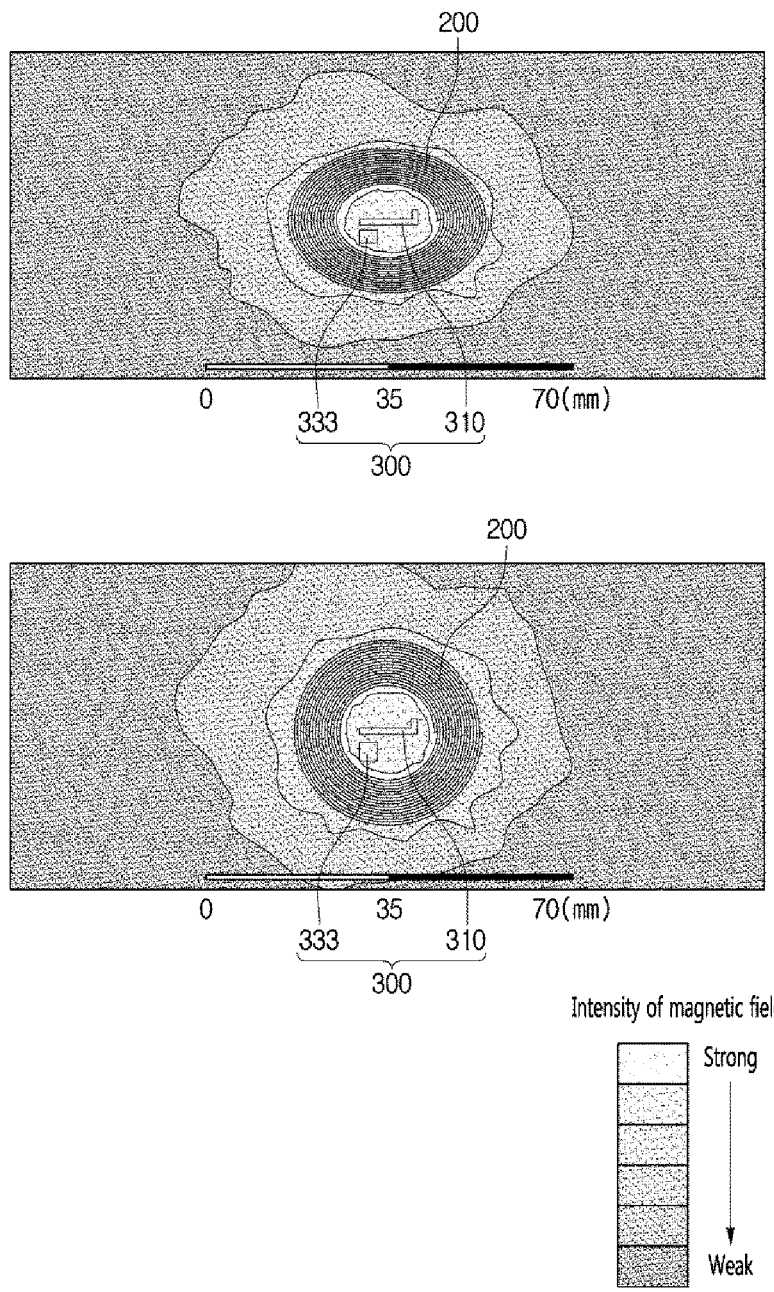

[FIG. 16]
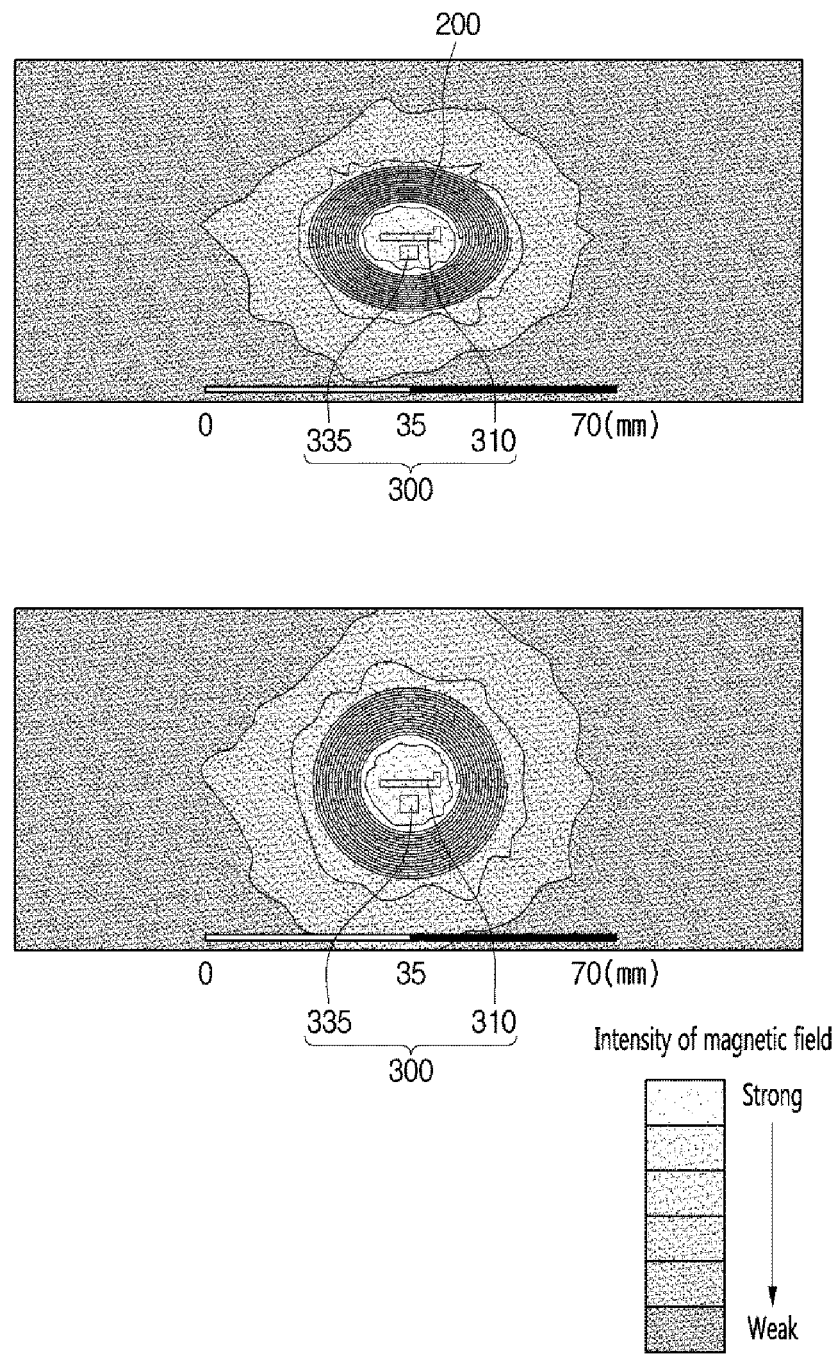

[FIG. 17]
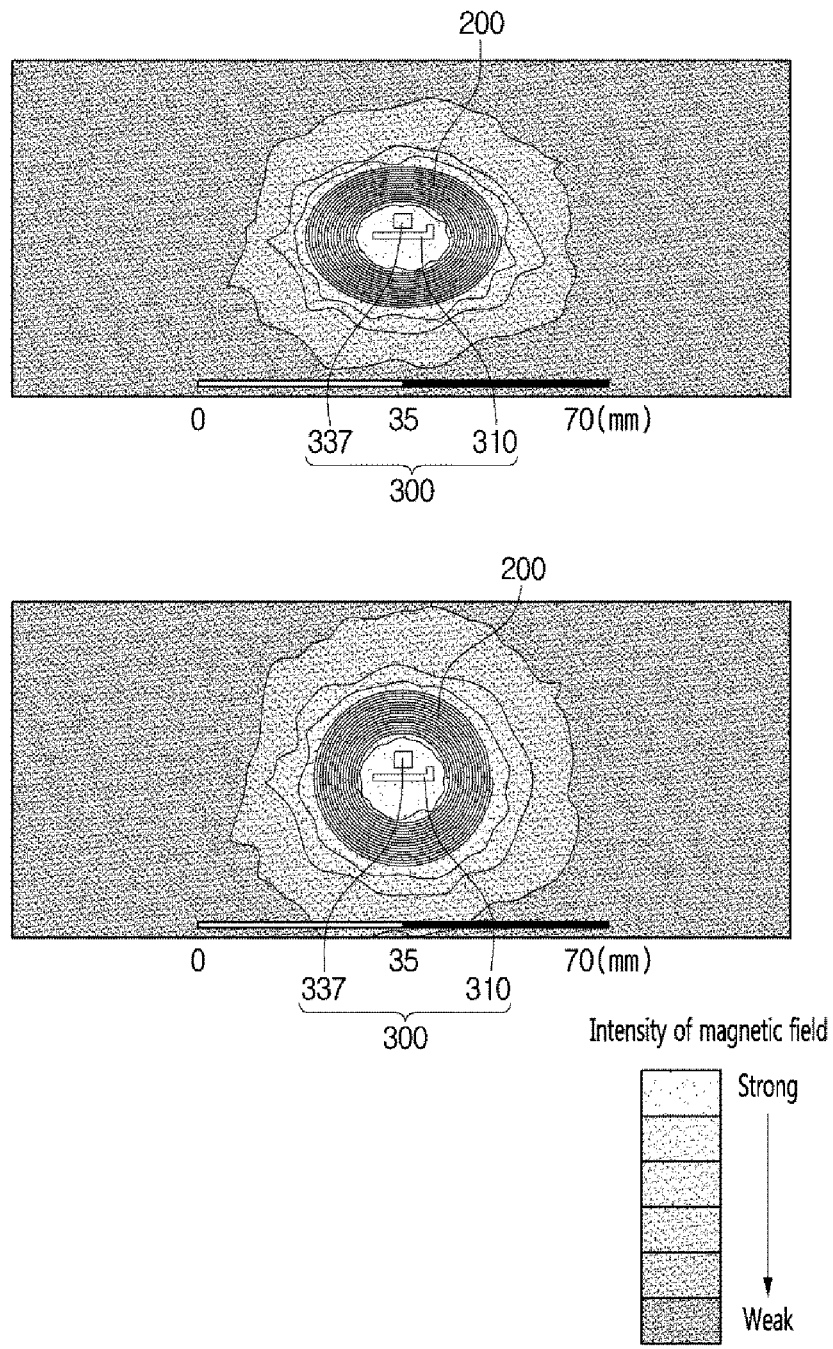

[FIG. 18]
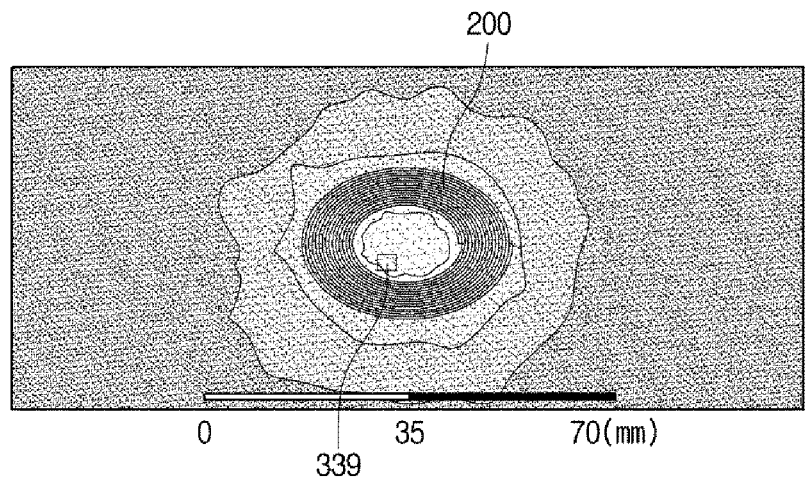
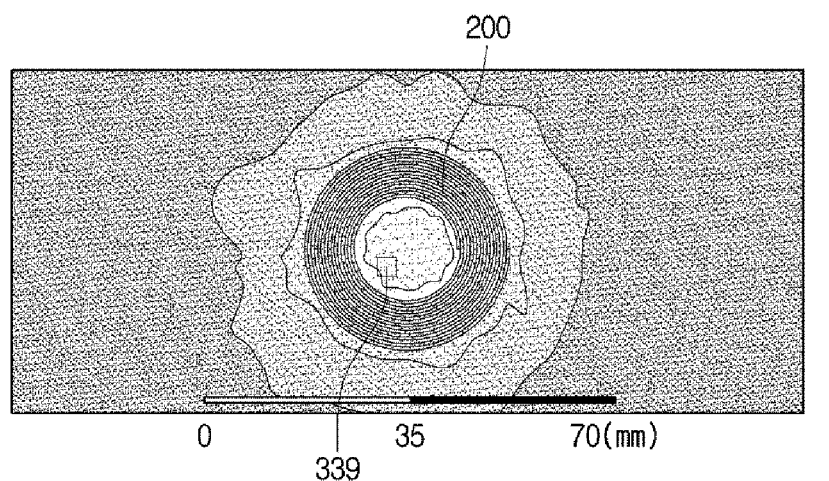
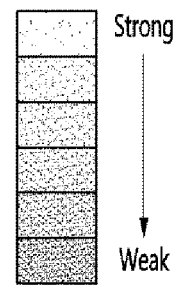

[FIG. 19]
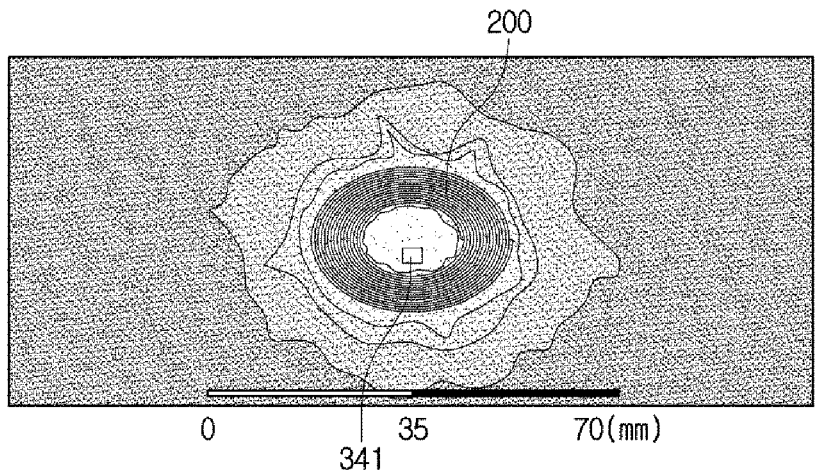
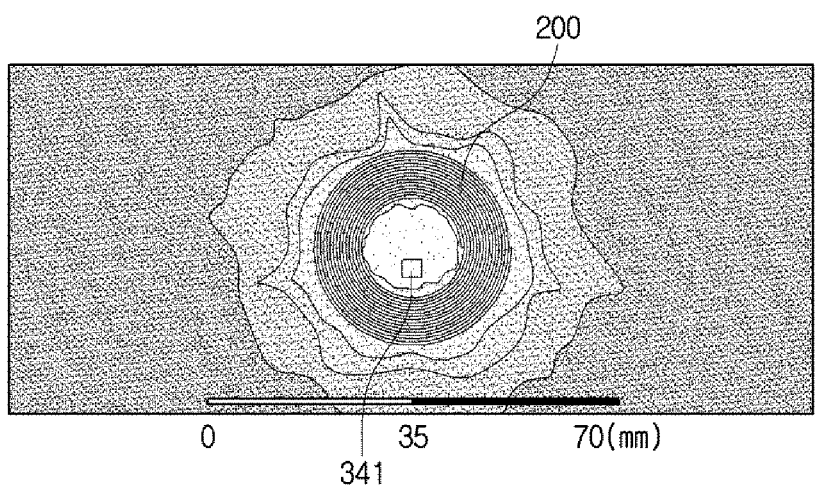
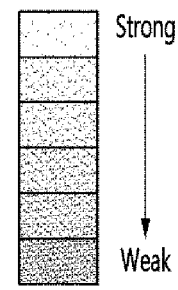
Intensity of magnetic field
Strong
↓
Weak

[FIG. 20]
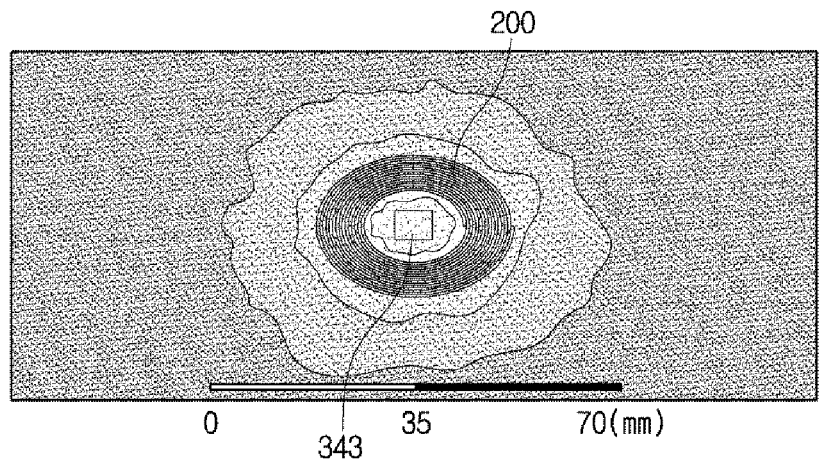
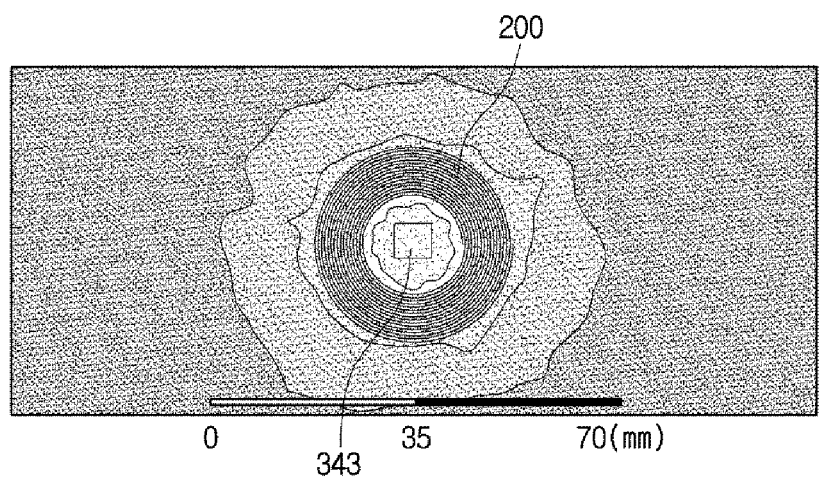
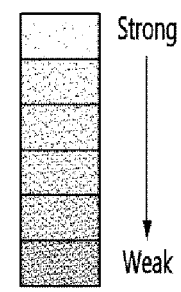

[FIG. 21]
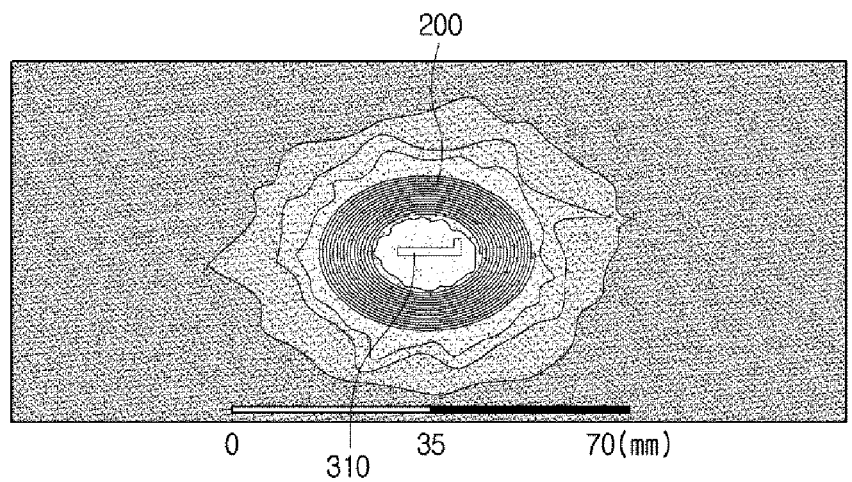
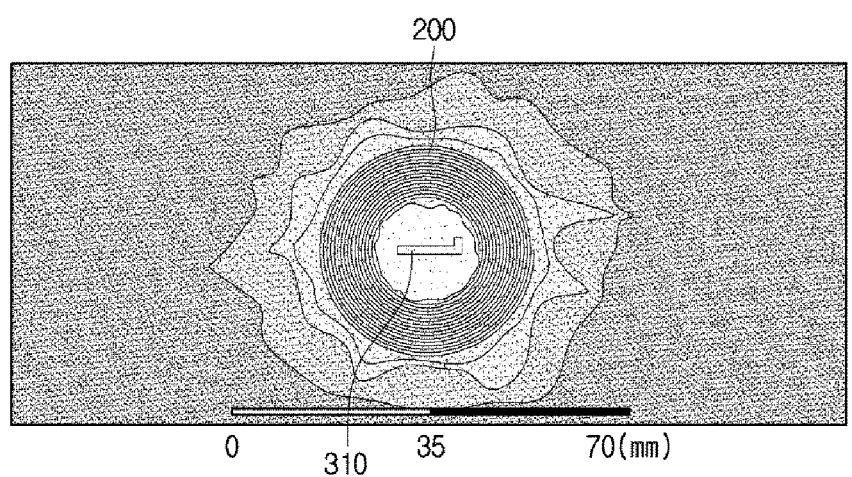
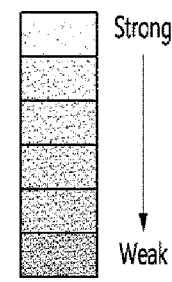

[FIG. 22]
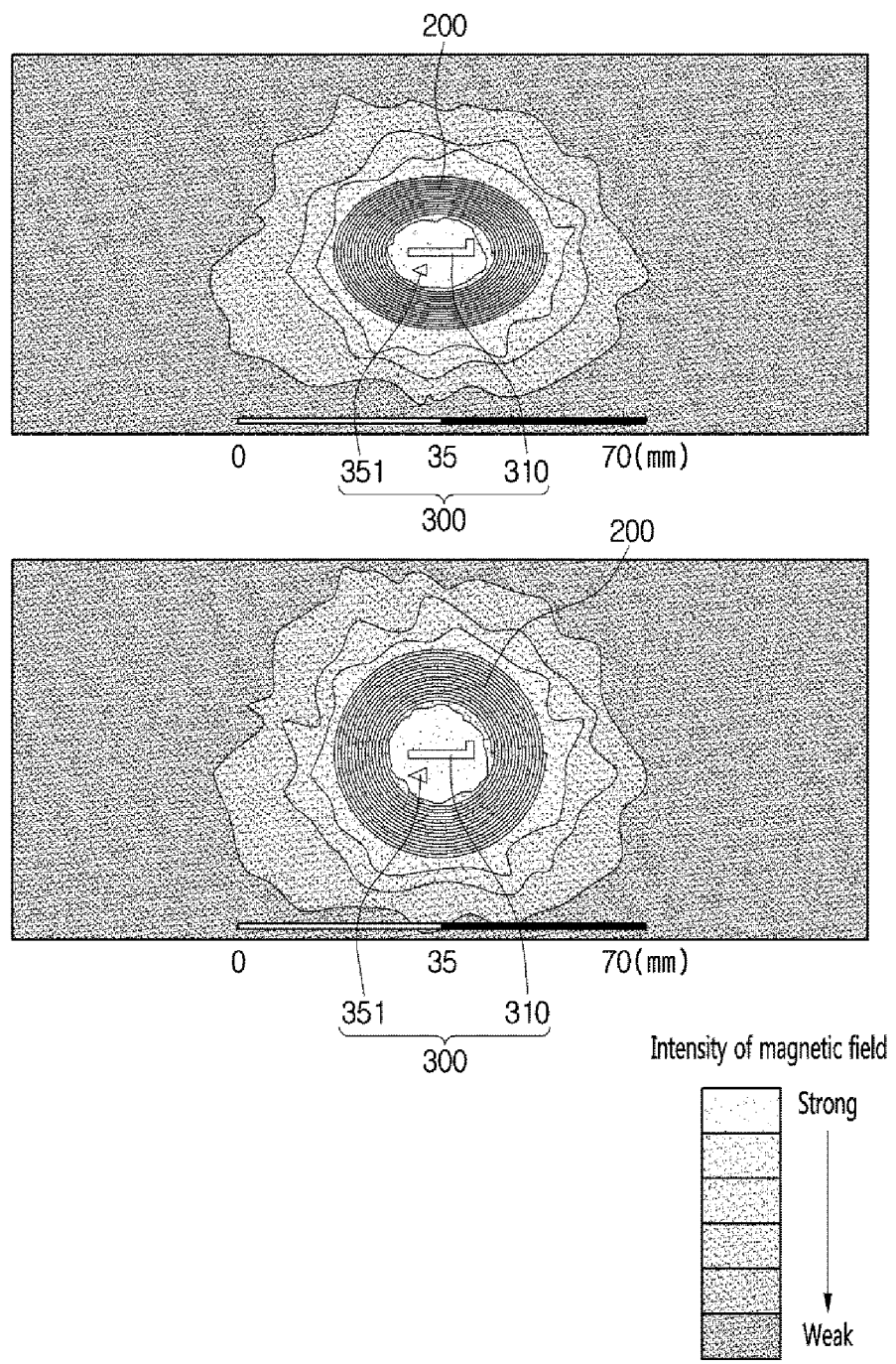

[FIG. 23]
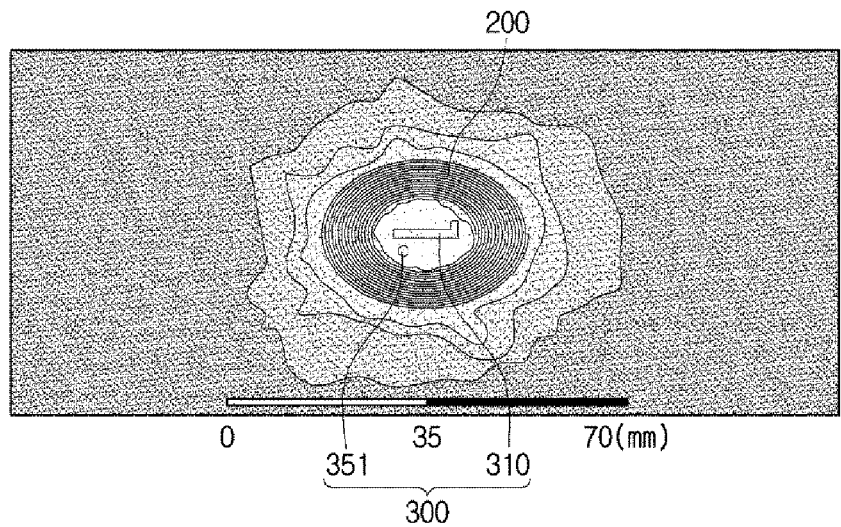
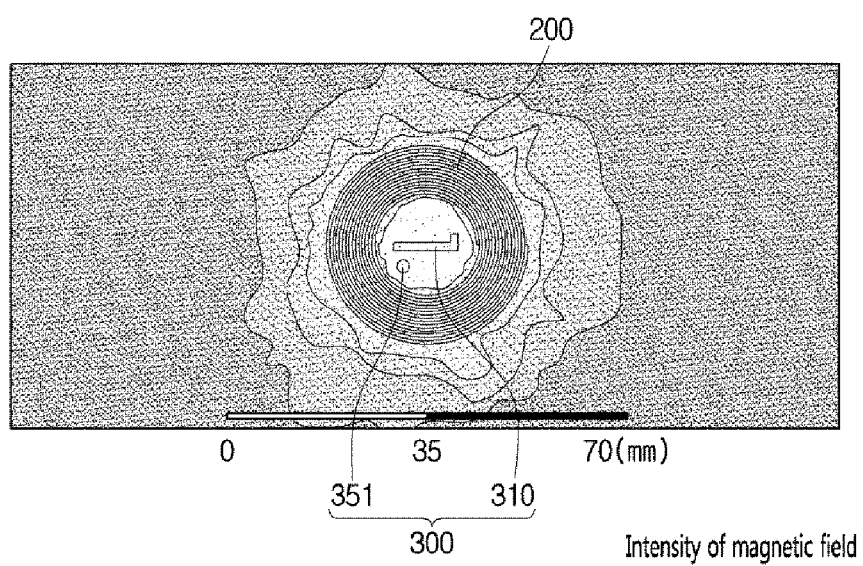
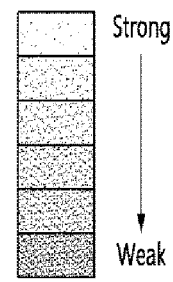

[FIG. 24]

| Inner diameter of reception coil(mm) | Inner area of reception coil(mm2) | Area of pattern (mm2) | Ratio | Efficiency with pattern(%) | Efficiency without pattern(%) |
|---|---|---|---|---|---|
| 20 | πX10X10=100π | 5X5=25 | 0.079 | 63.1 | 62.8 |
| 25 | πX12.5X12.5=156.25π | 10X10=100 | 0.204 | 64.5 | 63.5 |
| 30 | πX15X15=225π | 15X15=225 | 0.318 | 69.30 | 65.3 |
| 35 | πX17.5X17.5=306.25π | 20X20=400 | 0.416 | 67.70 | 64.8 |
| 40 | πX20X20=400π | 25X25=625 | 0.497 | 66.40 | 64.4 |
| 45 | πX22.5X22.5=506.25π | 30X30=900 | 0.566 | 65.80 | 64 |
| 50 | πX25X25=625π | 35X35=1225 | 0.624 | 65.30 | 63.7 |
| 55 | πX27.5X27.5=726.25π | 40X40=1600 | 0.701 | 65.00 | 63.2 |
| 60 | πX30X30=900π | 45X45=2025 | 0.716 | 64.2 | 62.5 |
| 65 | πX32.5X32.5=1056.25π | 50X50=2500 | 0.753 | 63.7 | 61.8 |

[FIG. 25]
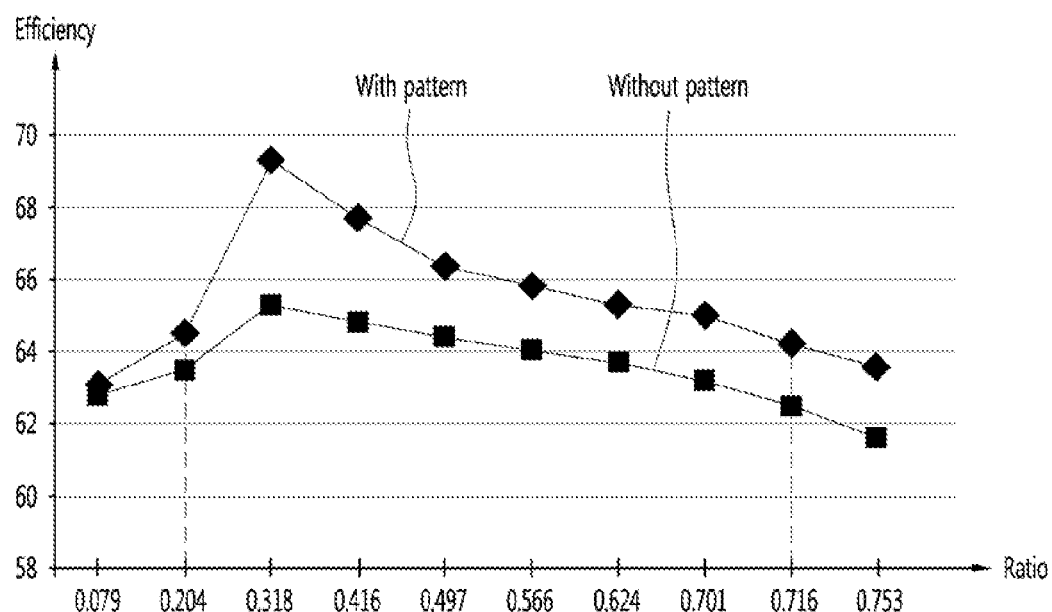

WIRELESS POWER RECEPTION DEVICE

TECHNICAL FIELD

The embodiment relates to a wireless power transmission technique. More particularly, the embodiment relates to a wireless power receiver for preventing the property of a magnetic substance of the wireless power receiver from being deteriorated and improving the power transmission efficiency.

BACKGROUND ART

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. The electromagnetic induction refers to a phenomenon in which voltage is induced so that current flows when a magnetic field is varied around a conductor. Although the commercialization of the electromagnetic induction technology has been rapidly progressed around small-size devices, the power transmission distance is short.

Until now, wireless energy transmission schemes include a remote telecommunication technology based on resonance and a short wave radio frequency in addition to the electromagnetic induction.

Recently, among wireless power transmission technologies, an energy transmitting scheme employing resonance has been widely used.

In a wireless power transmission system employing electromagnetic induction or resonance, since power is transferred through coils of the wireless power transmitter and the wireless power receiver, a user may easily charge electronic appliances such as a portable device.

In addition, the wireless power transmitter of the wireless power transmission system includes a magnet for aligning with the wireless power receiver. The relative positions of the coils of the wireless power transmitter and the wireless power receiver may be guided by the magnet provided inside a transmission coil of the wireless power transmitter, such that the coils of the wireless power transmitter and the wireless power receiver are aligned with each other, thereby improving the power transmission efficiency.

However, according to the related art, when the magnet provided to the transmission coil of the wireless power transmitter is inserted into an inside of the transmission coil, a reverse magnetic field generated from the magnet is offset against a magnetic field generated from a magnetic substance of the wireless power receiver to increase a saturation current, so that the magnetic substance may be saturated, thereby deteriorating a property of the magnetic substance. When the property of the magnetic substance is deteriorated, a property of the reception coil, that is, the inductance L and the resistance R of the reception coil may be varied, so that the quality factor (Q=W*L/R) of the reception coil may be reduced. Since, when the value of Q of the reception coil is reduced, the power transmission efficiency between the wireless power transmitter and the wireless power receiver may be reduced, there is a need to prevent the magnet from exerting an influence on the magnetic substance.

DISCLOSURE

Technical Problem

The embodiment provides a wireless power receiver which is capable of preventing a magnetic substance of the wireless power receiver from being saturated due to an influence of an external magnetic field thereupon.

In addition, the embodiment provides a wireless power receiver which is capable of preventing a magnetic substance of the wireless power receiver from being saturated due to a magnet provided to a wireless power transmitter, so that the power transmission efficiency between the wireless power transmitter and the wireless power receiver may be improved.

Technical Solution

A wireless power receiver, which wirelessly receives power from a wireless power transmitter, according to an embodiment may include a magnetic substance; a reception coil disposed on the magnetic substance and coupled to a transmission coil of the wireless power transmitter to receive the power; and a magnetic substance saturation protective unit disposed inside the reception coil to prevent the magnetic substance from being saturated due to an influence of an external magnetic field on the magnetic substance.

The magnetic substance saturation protective unit may prevent the magnetic substance from being saturated due to a magnet provided in the wireless power transmitter.

The magnetic substance saturation protective unit may change a direction of a magnetic field formed on the reception coil into an inside of the reception coil to prevent the magnetic substance from being saturated.

The magnetic substance saturation protective unit may include at least one of an L pattern, a circular pattern, a rectangular pattern, a triangular pattern and a hexagonal pattern which are formed of metal.

The magnetic substance saturation protective unit may include at least two of an L pattern, a circular pattern, a rectangular pattern, a triangular pattern and a hexagonal pattern.

One of the at least two patterns of the magnetic substance saturation protective unit may be disposed at a center of an inside of the reception coil, and the other patterns may be spaced apart from the center of the inside of the reception coil by a predetermined distance.

A ratio of an inside area of the reception coil to an area of the magnetic substance saturation protective unit may be in a range of 0.204 to 0.716.

Advantageous Effects

As described above, according to various embodiments, the configuration of the magnetic substance saturation protective unit including various patterns may prevent the magnetic substance of the wireless power receiver 10 from being saturated due to the magnet provided in the wireless power transmitter.

In addition, according to various embodiments, the wireless power receivers may change the direction of the magnetic field formed on the reception coil, so that the magnetic field may be concentrated on the inside of the reception coil.

For this reason, the power transmission efficiency between the wireless power transmitter and the wireless power receiver may be improved.

Meanwhile, any other various effects will be directly and implicitly described below in the description of the embodiment.

DESCRIPTION OF DRAWINGS

FIG. 1 is a view illustrating a wireless power transmission system according to an embodiment.

FIG. 2 is a perspective view illustrating the wireless power receiver according to the one embodiment.

FIG. 3 is a table illustrating a specification of a reception coil of the wireless power receiver according to the one embodiment.

FIG. 4 is a view illustrating a direction of a magnetic field formed on the reception coil when a magnetic substance saturation protective unit according to an embodiment is used.

FIGS. 5 to 23 are views showing H-fields for illustrating radiation patterns of magnetic fields according various embodiments.

FIG. 24 is an experimental data table illustrating power transmission efficiency according to a ratio of the inner area of the reception coil 200 to the area of a rectangular pattern according to an embodiment.

FIG. 25 is a graph illustrating power transmission efficiency according to a ratio of the inner area of the reception coil 200 to the area of a rectangular pattern according to an embodiment.

BEST MODE

Mode for Invention

Hereinafter, preferable embodiments will be described in detail with reference to accompanying drawings in such a manner that the embodiments may be easily carried out by those skilled in the art.

First, a wireless power receiver 10 according to one embodiment will be described with reference to FIGS. 1 to 4.

FIG. 1 is a plan view illustrating a wireless power receiver according to one embodiment. FIG. 2 is a perspective view illustrating the wireless power receiver according to one embodiment. FIG. 3 is a table illustrating a specification of a reception coil of the wireless power receiver according to one embodiment. FIG. 4 is a view illustrating a direction of a magnetic field formed on the reception coil when a magnetic substance saturation protective unit according to an embodiment is used.

First, referring to FIGS. 1 and 2, the wireless power receiver 10 may include a magnetic substance 100, a reception coil 200, and a magnetic substance saturation protective unit 300.

The magnetic substance 100 may change a direction of a magnetic field received from a wireless power transmitter. In detail, the magnetic substance 100 may reduce a quantity of the magnetic field leaked to an outside by changing the direction of the magnetic field received from a transmission coil provided in the wireless power transmitter into an inside of the reception coil 200. Thus, the shielding effect of minimizing the quantity of the magnetic field leaked to an outside may be achieved.

In addition, the magnetic substance 100 changes the direction of the magnetic field transmitted from the transmission coil of the wireless power transmitter into the inside of the reception coil 200, so that the reception may concentrically receive the magnetic field from the transmission coil.

In addition, the magnetic substance 100 may be absorb the magnetic field leaked to an outside among the magnetic field transmitted from the transmission coil and emit the absorbed magnetic field as heat. Due to the function of the magnetic substance 100, the quantity of the magnetic field leaked to an outside to be harmful to humans may be reduced.

The magnetic substance 100 may be in a form of a sheet or a substrate. The reception coil 200 and the magnetic substance saturation protective unit 300 described below may be disposed on the magnetic substance 100.

The reception coil 200 may be coupled to the transmission coil provided in the wireless power transmitter, so that the reception coil 200 may wirelessly receive power from the transmission coil through the magnetic field. According to one embodiment, the reception coil 200 may wirelessly receive power from the transmission through electromagnetic induction. The power received by the reception coil 200 may be AC power and the AC power received by the reception coil 200 may be supplied to a load through a rectifier circuit. The load may be a rechargeable battery or an apparatus requiring DC power.

The reception coil 200 may have a spiral or helical-shaped pattern, but the embodiment is not limited thereto.

The reception coil 200 may be disposed on the magnetic substance 100 and may have a pattern formed by winding a plurality of electric wires.

The detail specification about the reception coil 200 according to the embodiment will be described with reference to FIG. 3.

Referring to FIG. 3, a frequency used for wireless power transmission may be in the range of 100 kHz to 150 kHz. The reception coil 200 may have a thickness T of 0.1 mm. A thickness of one electric wire constituting the reception coil 200 may be 0.6 mm. The number of turns of winding wires of the reception coil 200 may be 15 turns. An inner diameter of the reception coil 200 may be 20 mm and an outer diameter of the reception coil 200 may be 40 mm. An interval between the wires constituting the reception coil 200 may be in the range of 0.12 mm to 0.14 mm.

FIGS. 1 and 2 will be described again.

The magnetic substance saturation protective unit 300 may be disposed on the magnetic substance 100 and inside the reception coil 200.

The magnetic substance saturation protective unit 300 includes at least one metal pattern. In this case, the metal pattern may be made of metal and may be a polygonal pattern. The polygonal pattern may include a circular pattern, an L pattern, a rectangular pattern, a triangular pattern and a hexagonal pattern, but the embodiment is not limited thereto.

The magnetic substance saturation protective unit 300 may include an L pattern and a circular pattern. In this case, the L pattern may be disposed at the center of an inside of the reception coil 200, and the circular pattern may be disposed at one side of the L pattern. According to one embodiment, the circular pattern may have various areas.

The magnetic substance saturation protective unit 300 may include the L pattern and the rectangular pattern. In this case, the L pattern may be disposed at the center of an inside of the reception coil 200, and the rectangular pattern may be disposed at one side of the L pattern. The rectangular pattern may be a square pattern and have various areas.

The magnetic substance saturation protective unit 300 may include the L pattern and the triangular pattern. In this case, the L pattern may be disposed at the center of an inside of the reception coil 200, and the triangular pattern may be disposed at one side of the L pattern. The triangular pattern may be a regular triangle pattern and have various areas.

The magnetic substance saturation protective unit 300 may include the L pattern and the hexagonal pattern. In this case, the L pattern may be disposed at the center of an inside of the reception coil 200, and the hexagonal pattern may be disposed at one side of the L pattern.

The magnetic substance saturation protective unit 300 may include only one of the L pattern, the rectangular pattern and the circular pattern. In this case, the L pattern, the rectangular pattern and the circular pattern may be disposed inside the reception coil 200. According to one embodiment, each pattern may be disposed at the center of an inside of the reception coil 200 and spaced apart from the center of the inside of the reception coil 200 by a predetermined distance.

According to one embodiment, the metal may include at least one of copper, gold and silver, but the embodiment is not limited thereto.

The magnetic substance saturation protective unit 300, which may include various patterns, may prevent the magnetic substance 100 form being saturated due to a magnet provided in the wireless power transmitter. This will be described in detail below. In order to align the relative positions of the transmission and reception coils, the wireless power transmitter may include a magnet inside the transmission coil. When the reverse magnetic field generated from the magnet is offset against the magnetic field generated from the magnetic substance 100 thereby to increase a saturation current, so that the magnetic substance may be saturated, thereby deteriorating the property of the magnetic substance 100. When the property of the magnetic substance 100 is deteriorated, the property of the reception coil 200, that is, the inductance L and the resistance R of the reception coil 200 may be varied, so that the quality factor (Q=W*L/R) of the reception coil 200 may be reduced. Since, when the value of Q of the reception coil 200 is reduced, the power transmission efficiency between the wireless power transmitter and the wireless power receiver 10 may be reduced, there is a need to prevent the magnet from exerting an influence on the magnetic substance 100.

Thus, the magnetic substance saturation protective unit 300 induces the magnetic field formed on the reception coil 200 to the inside of the reception coil 200, so that an influence of the magnet, which is provided in the wireless, applied to the magnetic substance 100 may be minimized. For this reason, the magnetic substance 100 of the wireless power receiver 10 may be prevented from being saturated due to the magnet provided in the wireless power, and the power transmission efficiency between the transmission coil of the wireless power transmitter and the reception coil of the wireless power receiver 10 may be improved. This will be described with reference to FIG. 4.

For the purpose of convenience of explanation, the configurations of the magnetic substance 100 and the magnetic substance saturation protective unit 300 are not depicted in FIG. 4.

Referring to FIG. 4, the magnetic field is formed near the reception coil 200 in one direction. Particularly, when the magnetic substance saturation protective unit (not shown in FIG. 4) is disposed inside the reception coil 200 according to an embodiment, it may be confirmed that the direction of the magnetic field is changed into the inside of the reception coil 200 due to the magnetic substance saturation protective unit. This will be described in detail with reference to the simulation results shown in FIGS. 5 to 23.

Next, FIGS. 5 to 23 will be described.

FIGS. 5 to 23 are views showing H-fields for illustrating radiation patterns of magnetic fields according various embodiments.

In the H-Field of FIGS. 5 to 23, a lower brightness, that is, a darker brightness means a lower intensity of a magnetic field. The intensity of a magnetic field corresponding to each brightness is denoted at the left upper ends of each simulation data.

In addition, in each of FIGS. 5 to 23, (a) shows the radiation pattern of a magnetic field based on the perspective view of the wireless power receiver, and (b) shows the radiation pattern of a magnetic field based on the plan view of the wireless power receiver.

In FIGS. 5 to 23, the specification of the reception coil 200 is identical to that described in FIG. 3. Specifically, the frequency used for the simulation is 150 kHz, and the interval between the wires of the reception coil 200 is 0.12 mm.

In addition, for the purpose of convenience of explanation, the configuration of the magnetic substance 100 is omitted from FIGS. 5 to 23.

First, FIG. 5 shows the radiation pattern of a magnetic field in case that the magnetic substance saturation protective unit 300 is not included.

Referring to FIG. 6, the magnetic substance saturation protective unit 300 may include an L pattern 310 and a circular pattern 320. The L pattern 310 may be disposed at the center of an inside of the reception coil 200, and the circular pattern 320 may be disposed at one side of the L pattern 310. Specifically, the circular pattern 320 may be disposed on a left lower end on the basis of the center of the inside of the reception coil 200. In this case, a diameter of the circular pattern 320 is 2 mm. The L pattern 310 and the circular pattern 320 are disposed inside the reception coil 200, so that the direction of the magnetic field formed on the reception coil 200 may be concentrated on the inside of the reception coil 200. That is, when the radiation patterns of the magnetic fields of FIGS. 5 and 6 are compared with each other, it may be confirmed that the intensity of the magnetic field formed inside the reception coil 200 of FIG. 6 including the magnetic substance saturation protective unit 300 is greater than that of FIG. 5.

Next, referring to FIG. 7, the magnetic substance saturation protective unit 300 may include an L pattern 310 and a circular pattern 321. The L pattern 310 may be disposed at the center of an inside of the reception coil 200, and the circular pattern 321 may be disposed at one side of the L pattern 310. Specifically, the circular pattern 321 may be disposed on a left lower end on the basis of the center of the inside of the reception coil 200. In this case, a diameter of the circular pattern 321 is 4 mm. The L pattern 310 and the circular pattern 320 are disposed inside the reception coil 200, so that the direction of the magnetic field formed on the reception coil 200 may be concentrated on the inside of the reception coil 200. That is, when the radiation patterns of the magnetic fields of FIGS. 5 and 7 are compared with each other, it may be confirmed that the intensity of the magnetic field formed inside the reception coil 200 of FIG. 7 including the magnetic substance saturation protective unit 300 is greater than that of FIG. 5.

Next, referring to FIG. 7, the magnetic substance saturation protective unit 300 may include an L pattern 310 and a circular pattern 322. The L pattern 310 may be disposed at the center of an inside of the reception coil 200, and the circular pattern 322 may be disposed at one side of the L pattern 310. Specifically, the circular pattern 322 may be disposed on a lower end on the basis of the center of the inside of the reception coil 200. In this case, a diameter of the circular pattern 322 is 4 mm. The L pattern 310 and the circular pattern 322 are disposed inside the reception coil 200, so that the direction of the magnetic field formed on the reception coil 200 may be concentrated on the inside of the reception coil 200. That is, when the radiation patterns of the magnetic fields of FIGS. 5 and 8 are compared with each other, it may be confirmed that the intensity of the magnetic field formed inside the reception coil 200 of FIG. 8 including the magnetic substance saturation protective unit 300 is greater than that of FIG. 5.

Next, referring to FIG. 9, the magnetic substance saturation protective unit 300 may include an L pattern 310 and a circular pattern 323. The L pattern 310 may be disposed at the center of an inside of the reception coil 200, and the circular pattern 323 may be disposed at one side of the L pattern 310. Specifically, the circular pattern 323 may be disposed on a left lower end on the basis of the center of the inside of the reception coil 200. In this case, a diameter of the circular pattern 323 is 4 mm. The L pattern 310 and the circular pattern 323 are disposed inside the reception coil 200, so that the direction of the magnetic field formed on the reception coil 200 may be concentrated on the inside of the reception coil 200. That is, when the radiation patterns of the magnetic fields of FIGS. 5 and 9 are compared with each other, it may be confirmed that the intensity of the magnetic field formed inside the reception coil 200 of FIG. 9 including the magnetic substance saturation protective unit 300 is greater than that of FIG. 5.

Next, referring to FIG. 10, the magnetic substance saturation protective unit 300 may include a circular pattern 324. The circular pattern 324 may be spaced apart from the center of the inside of the reception coil 200 toward a left lower end by a predetermined distance. In this case, a diameter of the circular pattern 324 is to 2 mm. The circular pattern 324 is disposed inside the reception coil 200, so that the direction of the magnetic field formed on the reception coil 200 may be concentrated on the inside of the reception coil 200. That is, when the radiation patterns of the magnetic fields of FIGS. 5 and 10 are compared with each other, it may be confirmed that the intensity of the magnetic field formed inside the reception coil 200 of FIG. 10 including the magnetic substance saturation protective unit 300 is greater than that of FIG. 5.

Next, referring to FIG. 11, the magnetic substance saturation protective unit 300 may include a circular pattern 325. The circular pattern 325 may be spaced apart from the center of the inside of the reception coil 200 toward a left lower end by a predetermined distance. In this case, a diameter of the circular pattern 324 is 4 mm. The circular pattern 325 is disposed inside the reception coil 200, so that the direction of the magnetic field formed on the reception coil 200 may be concentrated on the inside of the reception coil 200. That is, when the radiation patterns of the magnetic fields of FIGS. 5 and 11 are compared with each other, it may be confirmed that the intensity of the magnetic field formed inside the reception coil 200 of FIG. 10 including the magnetic substance saturation protective unit 300 is greater than that of FIG. 5. In addition, when FIGS. 10 and 11 are compared with each other, it may be confirmed that the embodiment of FIG. 11, in which an area of the circular pattern is larger than that of FIG. 10, has the intensity of the magnetic field formed inside the reception coil 200 greater than that of the embodiment of FIG. 10.

Next, referring to FIG. 12, the magnetic substance saturation protective unit 300 may include a circular pattern 326. The circular pattern 326 may be spaced apart from the center of the inside of the reception coil 200 toward a left end by a predetermined distance. In this case, a diameter of the circular pattern 326 is 4 mm. The circular pattern 326 is disposed inside the reception coil 200, so that the direction of the magnetic field formed on the reception coil 200 may be concentrated on the inside of the reception coil 200. That is, when the radiation patterns of the magnetic fields of FIGS. 5 and 12 are compared with each other, it may be confirmed that the intensity of the magnetic field formed inside the reception coil 200 of FIG. 12 including the magnetic substance saturation protective unit 300 is greater than that of FIG. 5.

Next, referring to FIG. 13, the magnetic substance saturation protective unit 300 may include a circular pattern 327. The circular pattern 327 may be disposed such that the center of the circular pattern 327 is aligned with the center of the inside of the reception coil 200. In this case, a diameter of the circular pattern 327 is 8 mm. The circular pattern 327 is disposed inside the reception coil 200, so that the direction of the magnetic field formed on the reception coil 200 may be concentrated on the inside of the reception coil 200. That is, when the radiation patterns of the magnetic fields of FIGS. 5 and 13 are compared with each other, it may be confirmed that the intensity of the magnetic field formed inside the reception coil 200 of FIG. 13 including the magnetic substance saturation protective unit 300 is greater than that of FIG. 5. In addition, when FIGS. 12 and 13 are compared with each other, it may be confirmed that the intensity of the magnetic field formed inside the reception coil 200 according to the embodiment of FIG. 13, in which an area of the circular pattern is larger than that of FIG. 12 and the center of the circular pattern is aligned with the center of the inside of the reception coil 200, is greater than that of the embodiment of FIG. 12.

Next, referring to FIG. 14, the magnetic substance saturation protective unit 300 may include an L pattern 310 and a rectangular pattern 331. The L pattern 310 may be disposed at the center of an inside of the reception coil 200, and the rectangular pattern 331 may be disposed at one side of the L pattern 310. Specifically, the rectangular pattern 331 may be disposed on a left lower end on the basis of the center of the inside of the reception coil 200. In this case, the rectangular pattern 331 may be square, and one side length of the square may be 3 mm. The L pattern 310 and the rectangular pattern 331 are disposed inside the reception coil 200, so that the direction of the magnetic field formed on the reception coil 200 may be concentrated on the inside of the reception coil 200. That is, when the radiation patterns of the magnetic fields of FIGS. 5 and 14 are compared with each other, it may be confirmed that the intensity of the magnetic field formed inside the reception coil 200 of FIG. 14 including the magnetic substance saturation protective unit 300 is greater than that of FIG. 5.

Next, referring to FIG. 15, the magnetic substance saturation protective unit 300 may include an L pattern 310 and a rectangular pattern 333. The L pattern 310 may be disposed at the center of an inside of the reception coil 200, and the rectangular pattern 333 may be disposed at one side of the L pattern 310. Specifically, the rectangular pattern 333 may be disposed on a left lower end on the basis of the center of the inside of the reception coil 200. In this case, the rectangular pattern 331 may be square, and one side length of the square may be 4 mm. The L pattern 310 and the rectangular pattern 333 are disposed inside the reception coil 200, so that the direction of the magnetic field formed on the reception coil 200 may be concentrated on the inside of the reception coil 200. That is, when the radiation patterns of the magnetic fields of FIGS. 5 and 15 are compared with each other, it may be confirmed that the intensity of the magnetic field formed inside the reception coil 200 of FIG. 15 including the magnetic substance saturation protective unit 300 is greater than that of FIG. 5. In addition, when FIGS. 14 and 15 are compared with each other, it may be confirmed that the embodiment of FIG. 15, in which has an area of the circular pattern is larger than that of FIG. 10, has the intensity of the magnetic field formed inside the reception coil 200 greater than that of the embodiment of FIG. 14.

Next, referring to FIG. 16, the magnetic substance saturation protective unit 300 may include an L pattern 310 and a rectangular pattern 335. The L pattern 310 may be disposed at the center of an inside of the reception coil 200, and the rectangular pattern 335 may be disposed at one side of the L pattern 310. Specifically, the rectangular pattern 335 may be disposed on a lower end on the basis of the center of the inside of the reception coil 200. In this case, the rectangular pattern 335 may be square, and one side length of the square may be 4 mm. The L pattern 310 and the rectangular pattern 335 are disposed inside the reception coil 200, so that the direction of the magnetic field formed on the reception coil 200 may be concentrated on the inside of the reception coil 200. That is, when the radiation patterns of the magnetic fields of FIGS. 5 and 16 are compared with each other, it may be confirmed that the intensity of the magnetic field formed inside the reception coil 200 of FIG. 16 including the magnetic substance saturation protective unit 300 is greater than that of FIG. 5.

Next, referring to FIG. 17, the magnetic substance saturation protective unit 300 may include an L pattern 310 and a rectangular pattern 337. The L pattern 310 may be disposed at the center of an inside of the reception coil 200, and the rectangular pattern 337 may be disposed at one side of the L pattern 310. Specifically, the rectangular pattern 337 may be spaced apart from the center of the inside of the reception coil 200 toward an upper end by a predetermined distance. In this case, the rectangular pattern 337 may be square, and one side length of the square may be 4 mm. The L pattern 310 and the rectangular pattern 337 are disposed inside the reception coil 200, so that the direction of the magnetic field formed on the reception coil 200 may be concentrated on the inside of the reception coil 200. That is, when the radiation patterns of the magnetic fields of FIGS. 5 and 17 are compared with each other, it may be confirmed that the intensity of the magnetic field formed inside the reception coil 200 of FIG. 17 including the magnetic substance saturation protective unit 300 is greater than that of FIG. 5.

Next, referring to FIG. 17, the magnetic substance saturation protective unit 300 may include a rectangular pattern 339. The rectangular pattern 339 may be spaced apart from the center of the inside of the reception coil 200 toward a left lower end by a predetermined distance. In this case, the rectangular pattern 339 may be square, and one side length of the square may be 4 mm. The rectangular pattern 339 is disposed inside the reception coil 200, so that the direction of the magnetic field formed on the reception coil 200 may be concentrated on the inside of the reception coil 200. That is, when the radiation patterns of the magnetic fields of FIGS. 5 and 18 are compared with each other, it may be confirmed that the intensity of the magnetic field formed inside the reception coil 200 of FIG. 18 including the magnetic substance saturation protective unit 300 is greater than that of FIG. 5.

Next, referring to FIG. 17, the magnetic substance saturation protective unit 300 may include a rectangular pattern 341. The rectangular pattern 341 may be spaced apart from the center of the inside of the reception coil 200 toward a lower end by a predetermined distance. In this case, the rectangular pattern 341 may be square, and one side length of the square may be 4 mm. The rectangular pattern 341 is disposed inside the reception coil 200, so that the direction of the magnetic field formed on the reception coil 200 may be concentrated on the inside of the reception coil 200. That is, when the radiation patterns of the magnetic fields of FIGS. 5 and 19 are compared with each other, it may be confirmed that the intensity of the magnetic field formed inside the reception coil 200 of FIG. 19 including the magnetic substance saturation protective unit 300 is greater than that of FIG. 5.

Next, referring to FIG. 20, the magnetic substance saturation protective unit 300 may include a rectangular pattern 343. The rectangular pattern 343 may be disposed such that the center of the rectangular pattern 343 is aligned with the center of the inside of the reception coil 200. In this case, the rectangular pattern 343 may be square, and one side length of the square may be 8 mm. The rectangular pattern 343 is disposed inside the reception coil 200, so that the direction of the magnetic field formed on the reception coil 200 may be concentrated on the inside of the reception coil 200. That is, when the radiation patterns of the magnetic fields of FIGS. 5 and 20 are compared with each other, it may be confirmed that the intensity of the magnetic field formed inside the reception coil 200 of FIG. 20 including the magnetic substance saturation protective unit 300 is greater than that of FIG. 5.

Next, referring to FIG. 21, the magnetic substance saturation protective unit 300 may include an L pattern 310. The L pattern 310 may be disposed at the center of an inside of the reception coil 200. In this case, the L pattern 310 is disposed inside the reception coil 200, so that the direction of the magnetic field formed on the reception coil 200 may be concentrated on the inside of the reception coil 200. That is, when the radiation patterns of the magnetic fields of FIGS. 5 and 21 are compared with each other, it may be confirmed that the intensity of the magnetic field formed inside the reception coil 200 of FIG. 21 including the magnetic substance saturation protective unit 300 is greater than that of FIG. 5.

Next, referring to FIG. 22, the magnetic substance saturation protective unit 300 may include an L pattern 310 and a triangular pattern 351. The L pattern 310 may be disposed at the center of an inside of the reception coil 200, and the triangular pattern 351 may be disposed at one side of the L pattern 310. Specifically, the triangular pattern 351 may be disposed on a left lower end on the basis of the center of the inside of the reception coil 200. In this case, the triangular pattern 351 may be an equilateral triangular pattern. The L pattern 310 and the triangular pattern 351 are disposed inside the reception coil 200, so that the direction of the magnetic field formed on the reception coil 200 may be concentrated on the inside of the reception coil 200. That is, when the radiation patterns of the magnetic fields of FIGS. 5 and 22 are compared with each other, it may be confirmed that the intensity of the magnetic field formed inside the reception coil 200 of FIG. 22 including the magnetic substance saturation protective unit 300 is greater than that of FIG. 5.

Next, referring to FIG. 23, the magnetic substance saturation protective unit 300 may include an L pattern 310 and a hexagonal pattern 361. The L pattern 310 may be disposed at the center of an inside of the reception coil 200, and the hexagonal pattern 361 may be disposed at one side of the L pattern 310. Specifically, the hexagonal pattern 361 may be disposed on a left lower end on the basis of the center of the inside of the reception coil 200. In this case, the triangular pattern 361 may be an equilateral hexagonal pattern. The L pattern 310 and the hexagonal pattern 361 are disposed inside the reception coil 200, so that the direction of the magnetic field formed on the reception coil 200 may be concentrated on the inside of the reception coil 200. That is, when the radiation patterns of the magnetic fields of FIGS. 5 and 23 are compared with each other, it may be confirmed that the intensity of the magnetic field formed inside the reception coil 200 of FIG. 23 including the magnetic substance saturation protective unit 300 is greater than that of FIG. 5.

As described above, according to various embodiments, the configuration of the magnetic substance saturation protective unit 300 including various patterns may prevent the magnetic substance 100 of the wireless power receiver 10 from being saturated due to the magnet provided in the wireless power transmitter.

In addition, according to various embodiments, the wireless power receivers 10 may change the direction of the magnetic field formed on the reception coil 200, so that the magnetic field may be concentrated on the inside of the reception coil 200. For this reason, the power transmission efficiency between the wireless power transmitter and the wireless power receiver 10 may be improved.

Hereinafter, a variation of power transmission efficiency for the inner area of a reception coil according to an embodiment and the area of a rectangular pattern will be described with reference to FIGS. 24 and 25.

FIG. 24 is an experimental data table illustrating power transmission efficiency according to a ratio of the inner area of the reception coil 200 to the area of a rectangular pattern according to an embodiment. FIG. 25 is a graph illustrating power transmission efficiency according to a ratio of the inner area of the reception coil 200 to the area of a rectangular pattern according to an embodiment.

The specification about the reception coil 200 used for the experimental data of FIGS. 24 and 25 is as follows. The thickness T of the reception coil 200 is 0.1 mm, the width of one wire constituting the reception coil 200 is 0.6 mm, the number of turns of the winding wires of the reception coil 200 may be 15, and the interval between the wires constituting the reception coil 200 may be in the range of 0.12 mm to 0.14 mm.

Referring to FIG. 24, the inner diameter of the reception coil 200, the inner area of the reception coil 200, the area of the rectangular patter disposed at the center of the inside of the reception coil 200, the ratio between the inner area of the reception coil 200 and the area of the rectangular pattern, the power transmission efficiency according to the ratio between the inner area of the reception coil 200 and the area of the rectangular pattern, and the experimental data of the power transmission efficiency in case that any rectangular patterns do not exist inside the reception coil 200 are depicted.

The inner diameter of the reception coil 200 may be the diameter of a circle formed inside the reception coil 200, and the inner area of the reception coil 200 may be the area of the circle. The rectangular pattern disposed at the center of the inside of the reception coil 200 may be square and the area thereof may be an area of the square.

When examining the power transmission efficiency according to the ratio of the inner area of the reception coil 200 to the area of the rectangular pattern with reference to FIGS. 24 and 25, it may be confirmed that the power transmission efficiency of the reception coil 200 having a pattern formed at the center of the inside of the reception coil 200 is greater than that of the reception coil having no patterns.

In recent years, the power transmission efficiency of wireless power transmission may be generally in the range of 60% to 64%. However, when a pattern is disposed at the center of an inside of the reception coil 200 to prevent the magnetic substance from being saturated, as shown in FIG. 25, it may be confirmed that the power transmission efficiency is improved as compared with that of the related art due to the pattern disposed at the center of an inside of the reception coil 200 to prevent the magnetic substance from being saturated. Specifically, according to an embodiment, when the ratio between the area of the inside of the reception coil 200 and the area of the rectangular pattern placed at the center of the inside of the reception coil 200 is in the range of 0.204 to 0.716, the power transmission efficiency exceeding 64% is obtained, so that the power transmission efficiency can be improved as compared with a power transmission technique of the related art. For example, the inner diameter of the reception coil 200 may be in the range of 25 mm to 60 mm, and the area of the rectangular pattern may be in the range of 100 mm$^2$ to 2,025 mm$^2$.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The wireless power receiver 10 may be mounted on a mobile terminal such as a portable phone, smart phone, a laptop computer, a digital broadcasting terminal, a PDA (Personal Digital Assistants), a PMP (Portable Multimedia Player), or a navigation terminal.

In addition, it shall be easily understood by those skilled in the art that the configuration according to the embodiment described in the disclosure may be applicable to a fixed terminal such as a digital TV or a desktop computer as well as a mobile terminal.

The invention claimed is:

1. A wireless power receiver comprising:
a magnetic substance;
a reception coil disposed on the magnetic substance and configured to receive power;
a first magnetic substance saturation protective pattern disposed inside a center of the reception coil disposed on the magnetic substance; and
a second magnetic substance saturation protective pattern disposed inside the center of the reception coil disposed on the magnetic substance,
wherein the second magnetic substance saturation protective pattern is disposed at one side of the first magnetic substance saturation protective pattern,
wherein the first magnetic substance saturation protective pattern has a different shape than the second magnetic substance saturation protective pattern, wherein the reception coil has a thickness of 0.1 mm, and a thickness of one electric wire constituting the reception coil is 0.6 mm, and an interval between wires constituting the reception coil is in a range of 0.12 mm to 0.14 mm, wherein a ratio of an inside area of the reception coil to an area of the first and second magnetic substance saturation protective patterns is in a range of 0.204 to 0.716, wherein an inner diameter of the reception coil is in a range of 25 mm to 60 mm, and the area of the first and second magnetic substance saturation protective patterns is in a range of 100 mm² to 2,025 mm², and wherein the first and second magnetic substance saturation protective patterns include a metal pattern including at least one of copper, gold and silver.

2. The wireless power receiver of claim 1, wherein the first and second magnetic substance saturation protective patterns include an L pattern, a circular pattern, a rectangular pattern, a triangular pattern and a hexagonal pattern.

3. The wireless power receiver of claim 1, wherein an intensity of a magnetic field formed inside the reception coil is increased as an area of the first and second magnetic substance saturation protective patterns is enlarged.

4. The wireless power receiver of claim 1, wherein an intensity of a magnetic field formed inside the reception coil is increased as centers of the first and second magnetic substance saturation protective patterns approach a center of the inside of the reception coil.

5. The wireless power receiver of claim 1, wherein the first magnetic substance saturation protective pattern includes an L pattern disposed at a center of the inside of the reception coil, and the second magnetic substance saturation protective pattern includes a circular pattern disposed at one side of the L pattern.

6. The wireless power receiver of claim 5, wherein the circular pattern is disposed at a left lower end of the one side of the L pattern or is disposed at a center of the one side of the L pattern.

7. The wireless power receiver of claim 1, wherein the first magnetic substance saturation protective pattern includes an L pattern disposed at a center of the inside of the reception coil, and the second magnetic substance saturation protective pattern includes a rectangular pattern disposed at one side of the L pattern.

8. The wireless power receiver of claim 7, wherein the rectangular pattern is disposed at a left lower end of the one side of the L pattern or is disposed at a center of the one side of the L pattern.

9. The wireless power receiver of claim 1, wherein the first magnetic substance saturation protective pattern includes an L pattern disposed at a center of the inside of the reception coil, and the second magnetic substance saturation protective pattern includes a triangular pattern disposed at one side of the L pattern.

10. The wireless power receiver of claim 9, wherein the triangular pattern is disposed at a left lower end of the one side of the L pattern.

11. The wireless power receiver of claim 1, wherein the first magnetic substance saturation protective pattern includes an L pattern disposed at a center of the inside of the reception coil, and the second magnetic substance saturation protective pattern includes a hexagonal pattern disposed at one side of the L pattern.

* * * * *